United States Patent [19]

Allaire et al.

[11] Patent Number: 5,557,414

[45] Date of Patent: * Sep. 17, 1996

[54] METHOD AND APPARATUS FOR CLASSIFYING ARTICLES ACCORDING TO THEIR COLOR

[75] Inventors: Gilles Allaire, Cap Rouge; Gratien Beauchemin, Sillery; Roger Garceau, Pierrefonds; Bruno Leclerc, Sainte-Foy, all of Canada

[73] Assignee: Centre de Recherche Industrielle du Québec, Ste-Foy, Canada

[ * ] Notice: The term of this patent shall not extend beyond the expiration date of Pat. No. 5,493,404.

[21] Appl. No.: 73,301

[22] Filed: Jun. 8, 1993

[30] Foreign Application Priority Data

Apr. 29, 1993 [CA] Canada ................................ 2095154

[51] Int. Cl.$^6$ ........................... G01N 21/27; G01N 21/89
[52] U.S. Cl. ......................... 356/407; 356/402; 356/237; 250/226
[58] Field of Search .................................. 356/402, 407, 356/237; 250/226

[56] References Cited

U.S. PATENT DOCUMENTS

| | | | |
|---|---|---|---|
| Re. 29,031 | 11/1976 | Irving et al. .............................. | 356/178 |
| 3,206,022 | 9/1965 | Roberts, Jr. et al. ...................... | 209/74 |
| 4,057,352 | 11/1977 | Babb ......................................... | 250/226 |
| 4,146,135 | 3/1979 | Sarkar et al. ............................. | 356/407 |
| 4,204,950 | 5/1980 | Burford, Jr. .............................. | 356/407 |
| 4,830,501 | 5/1989 | Terashita .................................. | 356/402 |
| 5,000,569 | 3/1991 | Nylund ..................................... | 356/237 |

Primary Examiner—Robert P. Limanek
Assistant Examiner—David B. Hardy

[57] ABSTRACT

A method and apparatus for classifying articles according to their color, wherein a first pair of wavelengths is selected on a plurality of light reflection curves in terms of a reflected light wavelength spectrum. An article to be inspected is illuminated with light comprising the first pair of wavelengths and light reflected therefrom is measured to detect light reflection values corresponding to this first pair or wavelengths. A primary signal is produced, which represents a resulting difference between the detected light reflection values, this signal being indicative of the color of the inspected article. At least one secondary wavelength is selected on the reflected light wavelength spectrum, and the inspected article is illuminated with light comprising this secondary wavelength and light reflected therefrom is measured to produce a secondary signal which is further indicative of the color of the inspected article. A computer provides a classification frame comprising a first pattern consisting of a first and second crossing set of lines respectively defined by mathematical analysis, this classification frame defining a plurality of color classes. The computer classifies the inspected article in one of the plurality of color classes defined by the frame whenever the primary and secondary signals comply with a specific condition. The computer rejects the inspected article whenever the primary and secondary signals do not comply with this specific condition.

38 Claims, 6 Drawing Sheets

METHOD AND APPARATUS FOR CLASSIFYING ARTICLES ACCORDING TO THEIR COLOR

BACKGROUND OF INVENTION

The present invention pertains to a method and apparatus for classifying articles according to their color.

In the past, many color sensing principles have been proposed. One such color sensing principle is described in U.S. Pat. No. 4,830,501 to Terashita et al., which consists of measuring light reflected from an article at different wavelengths to detect at least two light reflection values, the difference therebetween or the ratio thereof being indicative of the color of this article. The difference or the ratio of reflection values is then compared to a predetermined threshold value for classification purposes based on color characteristics. These different wavelengths used to detect the reflection values are selected according to the light reflection curves in terms of the reflected light wavelength spectrum, which are specific to the articles about which the color has to be sensed. In order to maximize color resolution, these wavelengths are typically chosen such that, for a given range of colors characterizing these articles, a maximum variation of reflected light intensity values corresponding to the wavelengths is observed. Therefore, wavelengths are generally selected to correspond to some peaks on light reflection curves, and such peaks should be characterized by relatively high amplitude variations depending on the color of the articles, so as to properly carry out color sensing and classification. Typically, each chosen peak wavelength corresponds to a dominant color component which characterizes the color of the articles to be inspected, the relative amount of such a color component being considered as a basis for color sensing and classification.

Other patents such as U.S. Pat. No. 4,204,950, to Burford, U.S. Pat. No. 4,146,135, to Sarkar, reissue No. 29,031, to Irving, and U.S. Pat. No. 3,206,022 to Roberts propose the use of characteristic wavelengths which are selected from light reflection curves for different kinds of articles. However, whenever articles presenting relatively slight but still visible color differences are involved, prior known color sensing methods which consider a limited number of wavelengths have failed to provide the resolution required. This is the case with color sensing of pieces made of a particular wood species and having to be classified in different categories for matching these pieces in wood furniture manufacturing. It has been found that red oak is a such species of wood, being characterized by a very high range of color hues, from light gray to dark red, and thus requiring a very high resolution color sensing and classification technique to classify in appropriate categories wood pieces giving substantially the same color perception to a person viewing at these pieces. Furthermore, high resolution has to be achieved while keeping the processing time required by the color sensing method as short as possible so as to implement such a method in a high volume automatic color article sensing apparatus, through minimizing the number of wavelength measurements and calculations.

SUMMARY OF INVENTION

It is therefore a feature of the present invention to provide a method for classifying articles according to their color which provides high color resolution.

Another feature of the present invention is to provide a method for classifying articles according to their color which requires a minimum processing time.

Another feature of the present invention is to provide a method for classifying articles according to their color which uses a minimum number of wavelength measurements and calculations and which is simple to implement in a color classifying apparatus.

Another feature of the present invention is to provide a method for classifying wood articles, especially for articles made of red oak.

Another feature of the present invention is to provide an apparatus for classifying articles according to their color.

Another feature of the present invention is to provide an apparatus for classifying wood articles, especially for articles made of red oak.

According to the above features, from a broad aspect, the present invention provides a method for classifying articles according to their color comprising the steps of:

(a) selecting a first pair of wavelengths on a plurality of light reflection curves in terms of a reflected light wavelength spectrum; (b) illuminating with light comprising the first pair of wavelengths an area of an article to be inspected; (c) measuring light reflected from this area at the first pair of wavelengths to detect corresponding light reflection values; (d) producing a primary signal representing a resulting difference between the detected light reflection values, this signal being indicative of the color of the inspected article; (e) selecting at least one secondary wavelength on the reflected light wavelength spectrum; (f) illuminating with light comprising this secondary wavelength the area of the inspected article; (g) measuring light reflected from this area at this secondary wavelength to produce a secondary signal which is further indicative of the color of the inspected article; (h) providing a classification frame comprising a first pattern consisting of a first and second crossing set of lines respectively defined by mathematical analysis, this classification frame defining a plurality of color classes; (i) classifying the inspected article in one of the plurality of color classes defined by the frame, whenever the primary and secondary signals comply with a specific condition; and (j) rejecting the inspected article whenever the primary and secondary signals do not comply With this specific condition.

According to a further broad aspect of the invention, there is provided an apparatus for classifying articles according to their color. Such apparatus comprises a means for placing each of said articles at a viewing location in the apparatus. There is also provided an illumination means emitting a light output comprising a pair of wavelengths selected from a plurality of light reflection curves in terms of a reflected light wavelength spectrum, and at least one secondary wavelength selected from theses curves. The light output is directed toward the viewing location for illuminating an area of an inspected article passing at said viewing location. There is also provided a means for measuring light reflected from the inspected article at the pair of wavelengths and at the secondary wavelength to detect corresponding light reflection values. A computer means is provided for producing a primary signal representing a resulting difference between said detected light reflection values corresponding to the pair of wavelengths, and a secondary signal corresponding the secondary wavelength, those signals being indicative of the color of the inspected article.

The computer means defines a classification frame comprising a first pattern consisting of a first and second crossing set of lines respectively defined by mathematical analysis, this classification frame defining a plurality of color classes. The computer means then classifies the inspected article in one of the plurality of color classes defined by the frame, whenever the primary signal and the secondary signal comply with a specific condition. The computer means rejects the inspected article whenever the primary and secondary signals do not comply with this specific condition.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
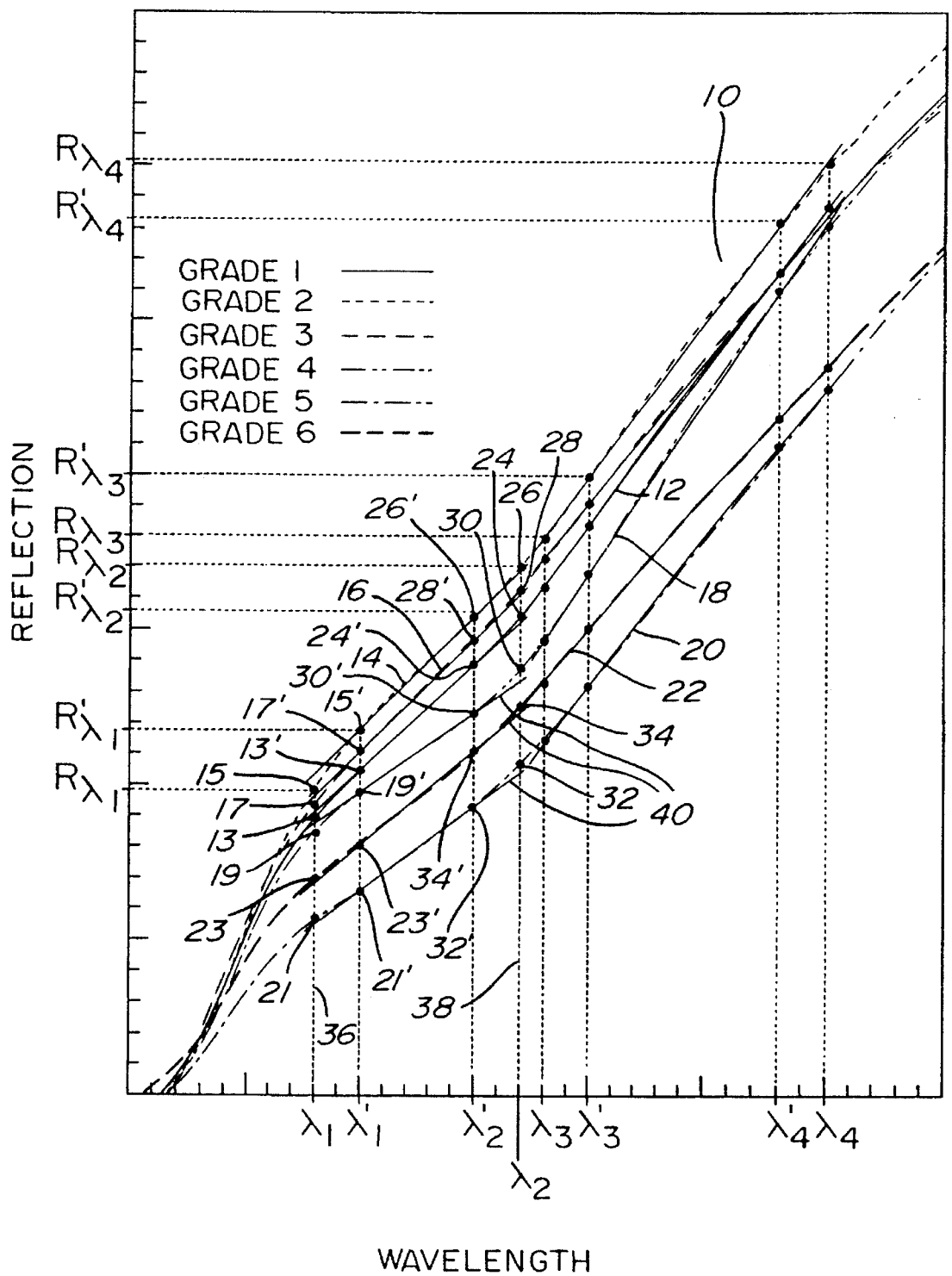
FIG. 1 is a graph showing reflection curves for a representative sample of articles, and providing as ordinate, the light reflection values as measured, and as abscissa, wavelengths over the reflected light spectrum, according the present invention.

Referring now to the drawings and more specifically to FIG. 1, there is shown a graph presenting a set of reflection curves, as generally designated at 10, which are expressed in terms of the wavelength spectrum of reflected light. Each curve of the set 10 corresponds to a respective article which has been selected from a batch of articles to be inspected, so as to constitute a sample of articles that is representative of the color range to be sensed. In the particular instance, reflection measurements have been made on a group of articles made of red oak, and six articles and corresponding reflection curves were selected by visual inspection of all articles in the batch. Each of the chosen articles is associated with a particular category among a given number of color categories, which are in the particular instance identified by grade 1 to grade 6, respectively corresponding to curves, 12, 14, 16, 18, 20 and 22. In the particular example as shown in FIG. 1, and as will be later described in greater detail, the reflection measurement has been accomplished using a light source, the output of which has been directed to a given area of the articles to be inspected, this light output being characterized by a near flat emission spectrum in the working spectrum portion, and using a spectrophotometer system which is readily available in the marketplace. It is pointed out that more than one area on the same article can be illuminated so as to measure light reflection values associated thereto, as will be later described with reference to the apparatus as shown in FIGS. 5A and 7A. The reflection values have been measured in terms of the percentage of the reflected light intensity over the light intensity as received at the article under inspection, a parameter commonly known as the reflectance value. The apparatus according to the proposed invention will be later described in greater detail. It is within the scope of the present invention, for sensing color applied to translucent articles such as photographic films, to measure the light transmitted through such articles, instead of measuring the reflected light for articles being substantially opaque as those contemplated in the example described in the present application.

In a preferred embodiment of the present invention, it has been found that color resolution can be maximized when the chosen wavelengths for the measurement of corresponding reflection values satisfies a particular condition in relation to all curves of curves set 10, as hereunder explained. As can be seen in FIG. 1, with reference to the curve 14 corresponding to wood grade 2, a pair of reflection values $R\lambda_1$ and $R\lambda 2$ correspond to a first pair of wavelength $\lambda_1$ and $\lambda_2$, thus defining respective points 15 and 26 on curve 14. Similarly, the points 13 and 24, 17 and 28, 19 and 30, 21 and 32, 23 and 34 on curves 12, 16, 18, 20 and 22, correspond to the same pair of wavelengths $\lambda_1$ and $\lambda_2$. The previously mentioned condition on values of $\lambda_1$ and $\lambda_2$ requires that corresponding vertical dotted lines 36 and 38 respectively intersect curves set 10 at points 13 and 24, 15 and 26, 17 and 28, 19 and 30, 21 and 32, 23 and 34, so that curve portions respectively delimited by these points are substantially linear, as can be seen by the straight lines 40 which have been superimposed on these curve portions for explanation purposes. It has been observed that the resolution achieved though calculation of a resulting difference between reflection values corresponding to these wavelengths is significantly greater than the resolution achieved with wavelengths that does not comply with the condition as proposed. Such resulting difference can be either obtained through calculation of a reflection values ratio or through reflection values subtraction. For instance, such a case would occur if a pair of wavelengths such as $\lambda_1$ and $\lambda_3$, as shown in the graph of FIG. 1, was selected, as could be suggested by prior art. In such a case, the resolution achieved is generally not sufficient to properly segregate inspected articles characterized by a very similar type of color signature. Although good results can be achieved if the pair of wavelengths is selected so to correspond to near linear curves portions respectively starting and ending at points 13 and 24, 15 and 26, 17 and 28, 19 and 30, 21 and 32, 23 and 34, for the example as hereabove explained, it has been found that the best result is achieved when the pair of wavelengths is selected in a such way that the curve portion defined between chosen wavelengths substantially fits over a straight line drawn therebetween, as shown by respectively starting and ending points 13' and 24', 15' and 26', 17' and 28', 19' and 30', 21' and 32', 23' and 34', which respectively correspond to pair of wavelengths $\lambda'_1$ and $\lambda'_2$ in the particular example as shown in FIG. 1.

For color measurements applied to articles made of red oak, it has been found that the pair of wavelengths should be preferably in the range of about 450 to about 500 nm, which corresponds to $\lambda'_1$ and $\lambda'_2$ in a particular example as shown in FIG. 1. However, for the red oak, experience has shown that reasonably good results can also be achieved using the pair of wavelengths in the range of about 430 to about 520 nm, corresponding to $\lambda_1$ and $\lambda_2$ in the same example as shown in FIG. 1.

It is also pointed out that, depending upon the nature of the inspected article, the light reflection curves could present more that one region of curves showing linear portions, as happens with articles made of red oak and as illustrated in FIG. 1. It can be seen that pairs of wavelengths $\lambda_3$–$\lambda_4$ and $\lambda_3'$–$\lambda_4'$ represent ranges of wavelength delimiting respectively near linear and linear curves portions, which are similar to the ranges and corresponding curves portions as delimited by pairs of wavelengths $\lambda_1$–$\lambda_2$ and $\lambda_1'$–$\lambda_2'$. Therefore, for article color sensing purposes, either curve regions associated to $\lambda_1$–$\lambda_2$ and $\lambda_1'$–$\lambda_2'$, or curve regions associated to $\lambda_3$–$\lambda_4$ and $\lambda_3'$–$\lambda_4'$, can be considered in selecting the working pair of wavelengths. Furthermore, illumination and reflection measurements associated with the first and the second pair of wavelengths can be carried out either on a single area of the inspected article, or on a respective distinct area on the same article. For color measurements applied to articles made of red oak, it has been found that the pair of wavelengths selected in this second curve regions should be preferably in a range of about 550 to about 630 nm, which corresponds to $\lambda'_3$ and $\lambda'_4$ in a particular example as shown in FIG. 1. However, for the red oak, experience has shown that reasonably good results can also be achieved using a pair of wavelengths comprised in a range of about 530 to about 650 nm, corresponding to $\lambda_3$ and $\lambda_4$ in the same example as shown in FIG. 1.

Thus, the measurement of light reflected from the article at a pair of wavelength selected according to the present invention, provide light reflection values that are then processed by an electronic calculating device or computer, as will be described later in greater detail, to produce a primary signal representing a resulting difference between the detected light reflection values. This primary signal is indicative of the color of the inspected article and could be fed to an electronic classification device to sort inspected articles according to predetermined color categories, as will be explained later in greater detail. To obtain a color output signal more representative of the average color of an article characterized by a non uniform color over its surface, refection value measurements and calculations can be carried out for more than one area on the article, and a mean primary signal can be so produced. This more specifically requires illuminating with light comprising the first pair of wavelengths at least one other area of the article under inspection and thus measuring light reflected thereon. A primary signal is then calculated for each of these additional areas, this primary signal representing either a difference between or a ratio of the detected light reflection values associated with respective wavelength of the first pair. The sum of all primary signals so produced are then produced, this result being finally divided by the total number or areas illuminated so as to obtain the desired mean primary color signal.

To improve color sensing resolution and besides reflectance measurement and calculation associated with the first pair of selected wavelengths, it is proposed to select, from the reflected wavelength spectrum of reflectance curves as shown in FIG. 1, one or more secondary wavelengths, preferably one to three, and to illuminate the article to be inspected with light comprising this or these secondary wavelengths. The light reflected from the article is then measured to produce, by adding corresponding values as measured, a secondary signal which is further indicative of the color of the inspected article, by providing an indication of the luminance thereof. It is well known in the art that, for characterizing colors showing substantially the same hue, the luminance parameter of reflected light can be evaluated by measuring the reflection values associated with a minimum of one given wavelength, and preferably with a set of three wavelengths, respectively comprised in the red, green and blue regions of the spectrum. In the case where only one secondary wavelength is used, such a single wavelength is preferably selected so as to maximize amplitude variation of signal associated with the range of luminance to be evaluated, while affording appropriate signal level. Furthermore, illumination and reflection measurements associated with the first pair of wavelengths, and with this or these secondary wavelengths, can be carried out either on a single area of the inspected article, or on different areas on the same article. Moreover, a mean secondary signal can be produced using the same method as earlier explained for the mean primary signal derivation. Similarly, regarding color sensing applied to articles made of red oak, it has been found that a good result is also achieved when at least one of these secondary wavelengths is preferably in the range of about 530 to about 650 nm.

Moreover, to improve color sensing resolution and reflectance measurement associated with secondary wavelengths, it is proposed to select, from the reflected wavelength spectrum of reflectance curves as shown in FIG. 1, one or more tertiary wavelengths, and to illuminate the article to be inspected with light comprising this or these tertiary wavelengths. The light reflected from the article is then measured to produce a tertiary signal which is further indicative of the color of the inspected article, by providing a better indication of the luminance thereof. The secondary signal only approximating the true luminance value, this tertiary signal, which is derived using a different wavelengths, provide a better color resolution. Furthermore, illumination and reflection measurements associated this tertiary wavelength can be carried out either on the same area of the inspected article as illuminated for measurements corresponding to the first pair of wavelengths and secondary wavelength, or on a different area on the same article. Moreover, a mean tertiary signal can be produced using the same method as earlier explained for the mean primary signal derivation. For color sensing applied to articles made of red oak, it has been found that a good result is achieved when at least one of these tertiary wavelengths is preferably in the range of about 430 to about 520 nm.

To still further improve color sensing, it has been found that to the first primary signal can be added a second primary signal, the combination thereof also giving a better color resolution. Here, it is suggested to select a second pair of wavelengths on the same light refection curves as earlier used for selecting the first pair of wavelengths, as those shown in FIG. 1, but considering another region of curves showing linear portions rather than considering the one as initially chosen, such another region of curves preferably respecting the linearity condition as earlier proposed. For instance, referring to FIG. 1, if a first pair of wavelengths is selected in such a manner to be in the range delimited by $\lambda_1-\lambda_2$ or in the range delimited by $\lambda_1'$ and $\lambda_2'$, as shown in FIG. 1, a second pair of wavelengths can be selected in a such manner to be in the range delimited by $\lambda_3-\lambda_4$ or in the range delimited by $\lambda_3'-\lambda_4'$. Reciprocally, if a first pair of wavelengths is selected in a such manner to be in the range delimited by $\lambda_3-\lambda_4$ or in the range delimited by $\lambda_3'-\lambda_4'$, a second pair of wavelengths can thus be selected to be in the range delimited by $\lambda_1-\lambda_2$ or in the range delimited by $\lambda_1'-\lambda_2'$. Furthermore, illumination and reflection measurements associated with this second pair of wavelengths can be carried out either on the same area of the inspected article as illuminated for measurements corresponding to the first pair of wavelengths, or on a different area on the same article. Moreover, a mean second primary signal can be produced using the same method as earlier explained for the mean first primary signal derivation. For color sensing applied to articles made of red oak, the use of same preferred wavelength values ranges as those hereaboved mentioned are suggested. After the second pair of wavelengths is selected, the article under inspection is illuminated with light comprising this second pair of wavelengths, and the light reflected from the article is then measured to provide light reflection values, which are then processed by an electronic calculating device or computer, as will be described later in greater detail, to produce this second primary signal representing either a difference between or a ratio of the detected light reflection values.

To even still further improve color sensing resolution and reflectance measurement and calculation associated with the second pair of selected wavelengths, it is proposed to select, from the reflected wavelength spectrum of reflectance curves as shown in FIG. 1, one or more tertiary wavelengths, and to illuminate the article to be inspected with light comprising this or these tertiary wavelengths. The light reflected from the article is then measured to produce a tertiary signal that is further indicative of the color of the inspected article, by providing an indication of the luminance thereof, as earlier explained. Furthermore, illumination and reflection measurements associated with this or these tertiary wavelengths can be carried out either on the same area of the inspected article as illuminated for measurements corresponding with the first and second pair of wavelengths, or on a different area on the same article. Moreover, a mean tertiary signal can be produced using the same method as earlier explained for the mean first primary signal derivation. For color sensing applied to articles made of red oak, at least one of these tertiary wavelengths is preferably in the range of about 430 to about 650 nm.

Aside from the color sensing aspect of the present invention, the main aspect of this invention concerns the color classification of articles in one of a plurality of color categories. This aspect will be hereabove described in reference to FIGS. 1, 2 and 3. For classification purposes, a similar sensing method as earlier described is preferably applied. A first pair of wavelengths is selected on a plurality of light reflection curves in terms of reflected light wavelength, as those shown in FIG. 1. An area on each of articles to be inspected is then illuminated with light comprising the first pair of wavelengths. The light reflected from the illuminated area of each article is measured to detect corresponding light reflection values, which are then processed to produce a primary color signal representing either a difference between or a ratio of said detected light reflection values. The so produced primary color signal is indicative of the color of the article being inspected. One or more secondary wavelengths on the reflected light wavelength spectrum are then selected. An area on each of articles to be inspected is then illuminated with light comprising this or these wavelengths. The light reflected from the illuminated area of each article is measured to detect light reflection values corresponding to a secondary wavelength, from which a secondary color signal is produced by addition of these light reflection values. As earlier explained, this secondary signal is further indicative of the color of the article being inspected.

Alternately, instead of producing a secondary signal, a second primary signal can be produced so as to give a better indication of the color of the article being inspected, as already provided by the first primary signal. In such a case, a second pair of wavelengths is selected on a plurality of light reflection curves in terms of reflected light wavelength, as those curves shown in FIG. 1. An area on each of articles to be inspected is then illuminated with light comprising this second pair of wavelengths. The light reflected from the illuminated area of each article is measured to detect corresponding light reflection values, which are then processed to produce a second primary color signal representing a resulting difference between said detected light reflection values. As earlier explained, the so produced second primary color signal is further indicative of the color of the article being inspected.

In an article classification method embodying the present invention, the first or second pair of wavelengths, with which the first and second primary signal are respectively associated, are selected from a plurality of light reflection curves in terms of reflected light wavelength spectrum, said curves being associated with a plurality of articles which constitute a sample representative of the color range to be sensed. The first or second pair of wavelengths delimits respectively a first or second range of wavelengths corresponding to light reflection values in said curves, the light reflection values in each of said curves being in a substantially linear relationship over the first or second range of wavelengths.

Figure 2:
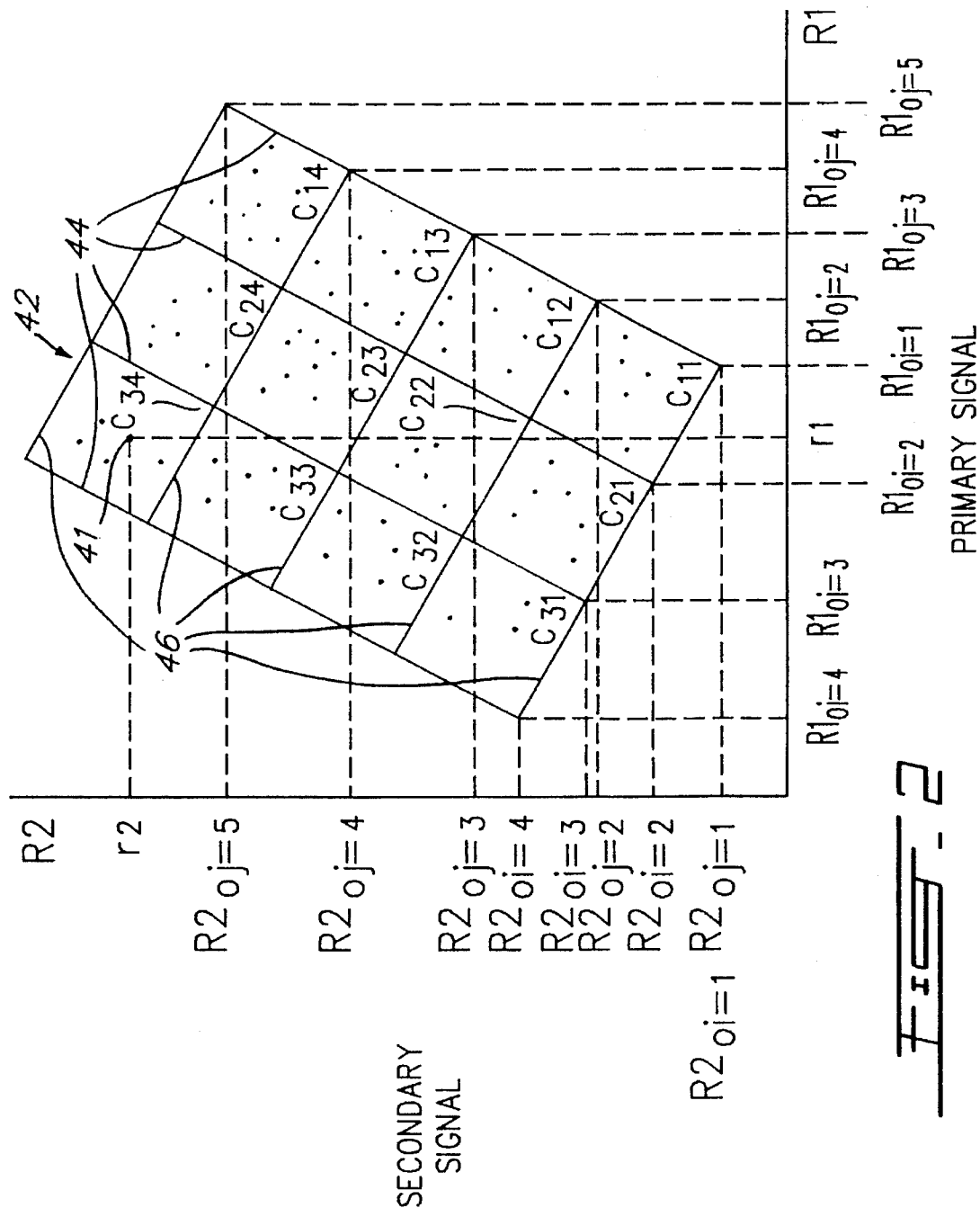
FIG. 2 is a two dimensional graph showing position of the color indicating points as provided by the method according to the invention and presenting, as abscissa on a first axis, the first primary color signal as produced for each article inspected, as ordinate on a second axis, the second primary or secondary color signal for each of those articles, and a proposed classification frame whereby color signals can be classified so as to assign corresponding articles to a specific one of a plurality of the color classes.

Referring now to FIG. 2, there is shown a two dimensional graph representing, as abscissa, the first primary color signal R1 produced for each article inspected, and as ordinate, the second primary or secondary color signal R2 for each of those articles, these signals being provided by the method as earlier explained. According to the proposed method, a given number of articles are selected from a batch of articles to be inspected, so as to form a sample of articles that is representative of the color range to be sensed. In the particular instance, a representative sample of articles made of red oak has been selected by visual inspection, and reflection measurements have been made for each article of this sample. Color signals associated with each article of the sample has been graphically represented, as shown in the graph of FIG. 2. For a given inspected article, the associated first primary color signal r1 and the second primary or secondary signal r2 form a given point designated at numeral 41 on the graph, each point having respective coordinates (r1, r2). A classification frame, generally designated at numeral 42, is then drawn over all of points 41, in a such manner that substantially each of these points are included in the classification frame 42. More specifically, the frame 42 comprises a first pattern consisting of a first an a second crossing set of lines designated as 44 and 46 on the system of axiss R1 and R2, which sets of lines are respectively defined by following relations:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for the first primary color signal on the axis R1 and corresponds to a line i of the first set of lines, i=1,n and n≧2;

$R1_j$ is a threshold value for the first primary color signal on the axis R1 and corresponds to a line j of the first set of lines, j=1,m and m≧2;

$R1_{0i}$ is the origin threshold value for the first primary color signal on the axis R1 and corresponds to a line i of the first set of lines;

$R1_{0j}$ is the origin threshold value for the first primary color signal on the axis R1 and corresponds to a line j of the first set of lines;

$R2_i$ is a threshold value for the second primary or secondary signal color signal on the axis R2 and corresponds to a line i of the second set of lines, i=1,n and n>,2;

$R2_j$ is a threshold value for the second primary or secondary color signal on the axis R2 and corresponds to a line j of the second set of lines, j=1, m and m≧2;

$R2_{0i}$ is the origin threshold value for the second primary or secondary color signal on the axis R2 and corresponds to a line i of the second set of lines;

$R2_{0j}$ is the origin threshold value for the second primary or secondary color signal on the axis R2 and corresponds to a line j of the second set of lines;

$m_1$ is a slope parameter for said line i, and is a positive value;

$m_2$ is a slope parameter for said line j, and is a positive value; and wherein $R1_{0i=1}$ and $R2_{0i=1}$ are respectively equal to $R1_{0j=1}$ and $R2_{0j=1}$.

The classification frame so drawn defines a plurality of color classes, designated as $C_{ij}$, i=1,n−1 and j=1, m−1, as shown in FIG. 2. It is pointed out that the number of classes, which equals to the product i×j, could be chosen by visual inspection of articles included in the sample, in a such manner that all articles associated in a given class can be visually paired.

Hence, the sample as initially selected being representative of all articles in the batch of articles to be inspected, each of these articles can be classified in a respective one of color classes $C_{ij}$ as defined by classification frame 42, whenever the first primary color signal r1 and the second primary or secondary color signal r2 comply with the following condition:

$$\left(\frac{r2 - R2_{0i}}{m_1}\right) + R1_{0i} \leq r1 < \left(\frac{r2 - R2_{0i+1}}{m_1}\right) + R1_{0i+1}$$

-continued and $$-m_2(r1 - R1_{0j}) + R2_{0j} \leq r2_{0j} < -m_2(r1 - R1_{0j+1}) + R2_{0j+1}$$

wherein $C_{ij}$ is the class delimited by lines i, i+1, j and j+1 of the classification frame, wherein i≦m−1, j≦m−1;

r1 is the first primary color signal indicative of the color of each one of articles to be inspected;

r2 is the second primary of secondary color signal further indicative of the color of each one of articles to be inspected.

Finally, a given article is rejected whenever the condition as hereabove stated is not satisfied by the color signals associated with this article.

Figure 3:
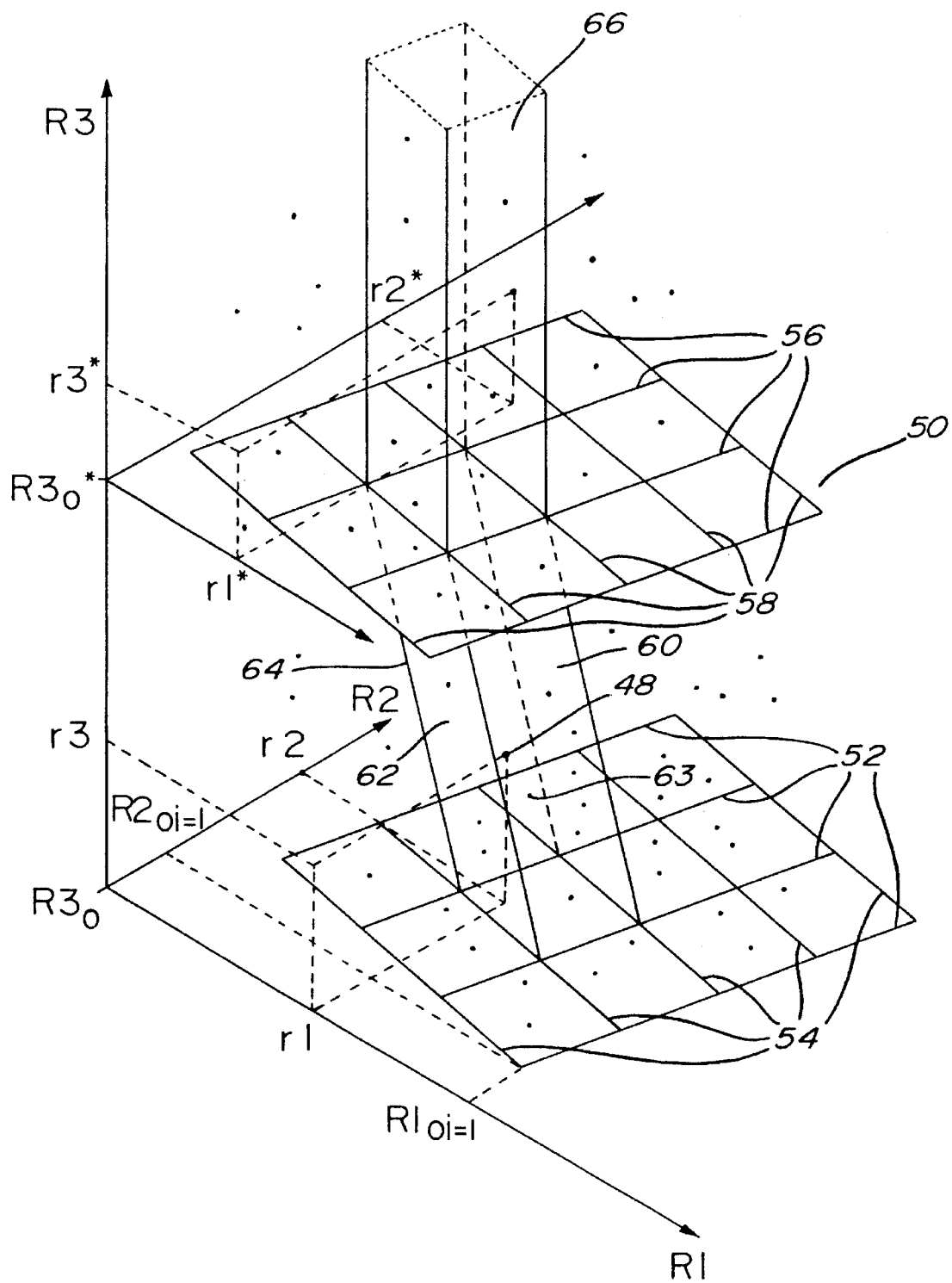
FIG. 3 is a three dimensional graph showing position of color indicating points provided by the method according to this invention and presenting, on a first axis, the primary reflection signal as produced for each article inspected, on a second axis, the second primary or secondary reflection signal for each of those articles, on a third axis, a tertiary signal for each of those articles, and a proposed classification frame whereby color signals can be classified so as to assign corresponding inspected articles to a specific one of a plurality of color classes.

Referring now to FIG. 3, there is shown a three dimensional graph representing, on a first axis, the primary color signal R1 as produced for each article inspected; on a second axis, the second primary or secondary color signal R2 for each of those articles; on a third axis, a tertiary color signal R3 for each of those articles; and a proposed classification frame whereby color signals can be classified so as to assign corresponding articles to a specific one of a plurality of color classes, as will be hereunder described. Primary and secondary color signals are provided by the method as earlier explained. The tertiary signal could be produced using at least one tertiary wavelength that must be different from a previously selected secondary wavelength, and according essentially to the same method as earlier exposed.

In the particular instance as shown in FIG. 3, a representative sample of articles made of red oak has been selected by visual inspection, and reflection measurements have been made for each article of this sample. Color signals associated with each article of the sample has been graphically represented, as shown in the graph of FIG. 3. For a given inspected article, the associated first primary color signal r1, the second primary or secondary signal r2 and the tertiary signal r3 form a given point designated at numeral 48 on the graph, each point having respective coordinates (r1, r2, r3). A classification frame, generally designated at numeral 50, is then drawn inside the tridimensional space defined by axiss R1, R2 and R3.

More specifically, the frame 50 comprises a first pattern consisting of a first and a second crossing set of lines, designated at 52 and 54, which are respectively defined by the following relations:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for a first primary signal on the axis R1 and corresponds to a line i of the first set of lines, i=1,n and n≧2;

$R1_j$ is a threshold value for the first primary signal on a the axis R1 and corresponds to a line j of said first set of lines, j=1,m and m≧2;

$R1_{0i}$ is the origin threshold value for the first primary signal on said first axis R1 and corresponds to a line i of said first set of lines;

$R1_{0j}$ is the origin threshold value for the first primary signal on the first axis R1 and corresponds to a line j of said first set of lines;

$R2_i$ is a threshold value for a second primary or secondary signal on the axis R2 and corresponds to a line i of said second set of lines, i=1,n and n≥2;

$R2_j$ is a threshold value for the second primary or secondary signal on the axis R2 and corresponds to a line j of said second set of lines, j=1,m and m≥2;

$R2_{0i}$ is the origin threshold value for the second primary or secondary signal on said the axis R2 and corresponds to a line i of said second set of lines;

$R2_{0j}$ is the origin threshold value for the second primary or secondary signal on the axis R2 and corresponds to a line j of said second set of lines;

$m_1$ is a slope parameter for said line i, and being a positive value;

$m_2$ is a slope parameter for said line j, and being a positive value; and wherein $R1_{0i=1}$ and $R2_{0i=1}$ are respectively equal to $R1_{0j=1}$ and $R2_{0j=1}$.

This first pattern lays in a plane intersecting third axis R3 at a point $R3_0$ which is a first threshold value for the tertiary signal produced.

As can be seen on FIG. 3, there is provided a second pattern consisting of a third and a fourth crossing set of lines designated at 56 and 58, which sets of lines are respectively defined by the following relations:

$$R2^*_i = m_3(R1^*_i - R1^*_{0i}) + R2^*_{0i}$$

and $$R2^*_j = m_4(R1^*_j - R1^*_{0j}) + R2^*_{0j}$$

wherein $R1^*_i$ is a threshold value for the first primary signal on the axis R1 and corresponds to a line i of the third set of lines, i=1,n and n≥2;

$R1^*_j$ is a threshold value for the first primary signal on the axis R1 and corresponds to a line j of the third set of lines, j=1,m and m≥2;

$R1^*_{0i}$ is the origin threshold value for the first primary signal on the axis R1 and corresponds to a line i of the third set of lines;

$R1^*_{0j}$ is the origin threshold value for the first primary signal on the axis R1 and corresponds to a line j of the third set of lines;

$R2^*_i$ is a threshold value for the second primary or secondary signal on the axis R2 and corresponds to a line i of the fourth set of lines, i=1,n and n≥2;

$R2^*_j$ is a threshold value for the second primary or secondary signal on the axis R2 and corresponds to a line j of the fourth set of lines, j=1,m and m≥2;

$R2^*_{0i}$ is the origin threshold value for the second primary or secondary signal on the axis R2 and corresponds to a line i of the fourth set of lines;

$R2^*_{0j}$ is the origin threshold value for the second primary or secondary signal on the axis R2 and corresponds to a line j of the fourth set of lines;

$m_3$ is a slope parameter for said line i, and being substantially equal to said slope parameter $m_1$;

$m_4$ is a slope parameter for said line j, and being substantially equal to said slope parameter $m_2$; and wherein $R1^*_{0i=1}$ and $R2^*_{0i=1}$ are respectively equal to $R1^*_{0j=1}$ and $R2^*_{0j=1}$.

The second pattern lays in a plane intersecting the third axis R3 at a point $R3^*_0 > R3_0$ which is a second threshold value for the tertiary signal, as earlier explained. Moreover, the following relation must be generally satisfied:

$$R1_{0i+1} - R1_{0i} = R1^*_{0i+1} - R1^*_{0i} \text{ for i=1,n}$$

and $$R2_{0j+1} - R1_{0j} = R2^*_{0j+1} - R2^*_{0j} \text{ for j=1,m.}$$

The classification frame 50 further comprises first and second sets of surfaces respectively designated at 60 and 62, only a portion of one of these surfaces being shown in FIG. 3 for the sake of clarity. The first set 60 comprises surfaces respectively intersecting lines i of the first set of lines 52, with corresponding lines i of the third set of lines 56. The second set 62 comprises surfaces respectively intersecting lines j of the second set of lines 54 with corresponding lines j of the fourth set of lines 58. Such a configuration of crossing sets of surfaces defines a first stage of (n−1)(m−1) color classification cells 63, each of those cells delimiting a respective classification space therein. It is noted that only one of these cells is represented in FIG. 3 for the sake of clarity. The classification step of the method then consists of classifying each of the articles to be inspected in a color class $C_{ij}$ associated with a respective one of the cells, whenever the first primary signal, the second primary or secondary signal and the tertiary signal corresponding to the area of the inspected article define a point located inside the corresponding classification cell. Furthermore, whenever the primary signal, the second primary or secondary signal and the tertiary signal define a point located in one or more of the surfaces defining adjacent cells, the corresponding article will be arbitrarily classified in the color class $C_{ij}$ having the lowest value of i and j associated with a respective one of adjacent cells. Obviously, it would be equivalent to arbitrarily classify such an article in the color class $C_{ij}$ having the highest value of i and j associated with a respective one of adjacent cells. Finally, a given article is rejected whenever the condition as hereabove stated is not satisfied by the colors signals associated with this article.

For the particular case of classifying articles made of red oak, it will be noted that, through the initial visual inspection, $R1_{0i=1}$ is preferably chosen in such a manner than its value is substantially different from $R1^*_{0i=1}$. Similarly, $R2_{0i=1}$ is preferably chosen in such a manner than its value is substantially different from $R2^*_{0i=1}$. Such conditions have been rendered necessary to obtain the best separation among articles showing respectively red and green shades.

Referring again to FIG. 3, an additional group of complementary classes $C^*_{ij}$ can be defined by the second pattern of lines 50, which classes correspond to cells 66. Here again, only one of these cells being represented for the sake of clarity. The color of an inspected article will be classified in a respective class $C^*_{ij}$ whenever its associated first primary signal, second primary or secondary signal and tertiary signal comply with the following condition:

$$\left( \frac{r2 - R2^*_{0i}}{m_3} \right) + R1^*_{0i} \leq r1 < \left( \frac{r2 - R2^*_{0i+1}}{m_3} \right) + R1^*_{0i+1}$$

-continued
and $$-m_4(r1 - R1_{0j}^*) + R2_{0j}^* \leq r2 < -m_4(r1 - R1_{0j+1}^*) + R2_{0j+1}^*$$

and $$r3 \geq R3_0^*$$

wherein
- $C_{ij}^*$ is the class delimited by lines i, i+1, j and j+1 of the second pattern of the classification frame, and wherein $i \leq n-1$, $j \leq m-1$;
- r1 is the first primary signal is indicative of the color of the article under inspection;
- r2 is the second primary or secondary signal is further indicative of the color of this article;
- r3 is the tertiary signal further indicative of the color of this article.

Here again, a given article is rejected whenever the condition as hereabove stated is not satisfied by the color signals associated with this article.

Figure 4:
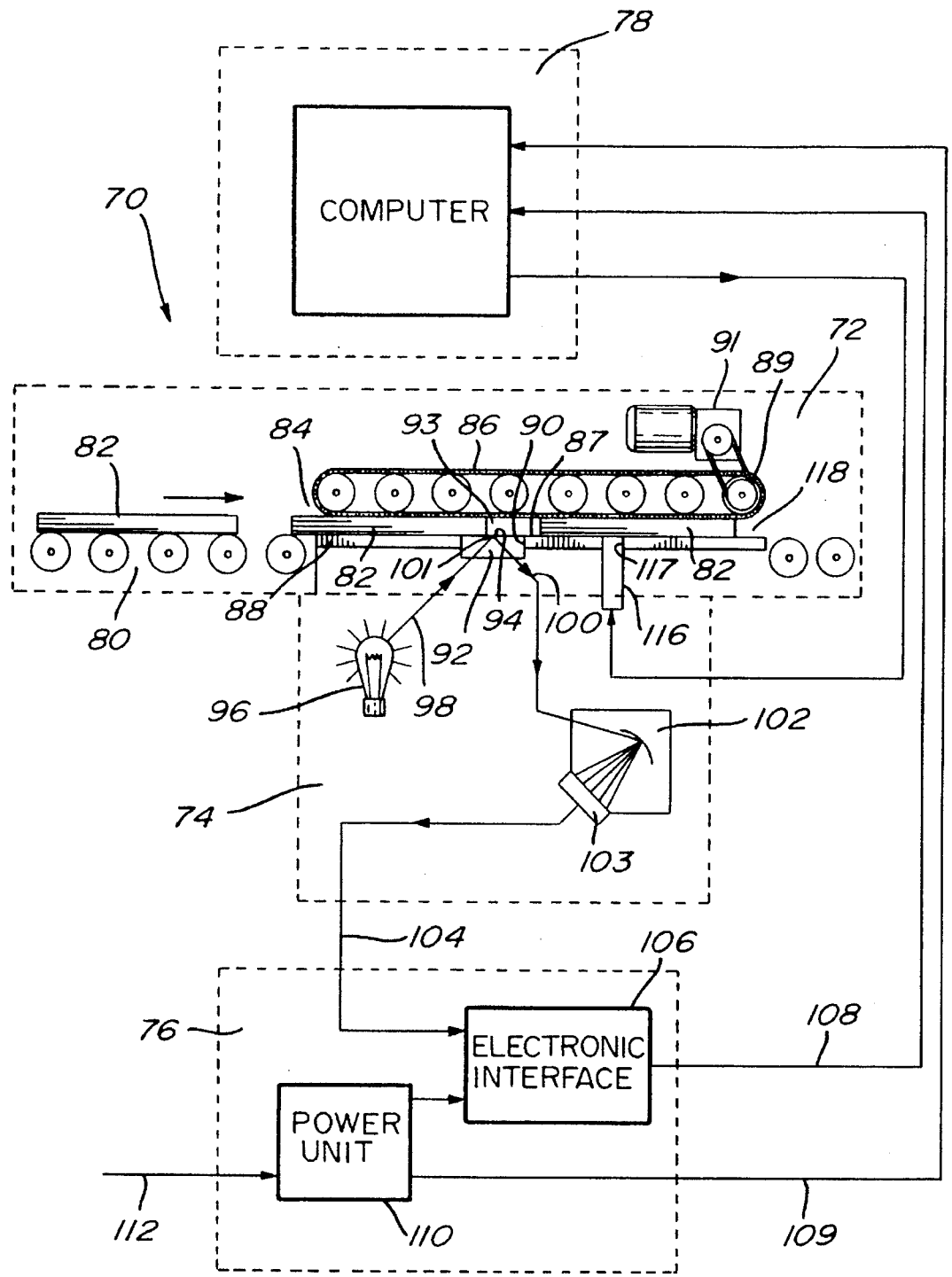
FIG. 4 is a schematic diagram of an example of the apparatus according to this invention showing a complete article classifying apparatus using a spectrophotometer as light measuring device.

Referring now to FIG. 4, there is shown a first example of the apparatus for classifying articles according to their color, which apparatus is generally indicated by reference to numeral 70. The apparatus comprises a handling unit generally designated at 72, a light measurement unit 74, a power and electronic unit 76 and a computer 78. The handling unit comprises a roll conveyer 80 on which articles 82 to be inspected are disposed to feed the input end 84 of the apparatus. As herein shown, articles 82 are disposed in an end-to-end relationship. An incoming article 82 is disposed at the input end 84 of the apparatus, and an upper belt conveyer 86, which is driven through pulley 89 by an electric motor 91, then moves the incoming article 82 along the upper surface 87 of an elongated flat bed plate 88 secured to the housing of the apparatus (not shown). A guide 85 provided on the bed plate 88 keeps aligned articles moving thereon, as better shown in FIG. 5A. The bed plate 88 comprises a viewing aperture 90 extending therethrough and above which articles 82 pass, whereby the undersides of articles 82 are presented to the viewing aperture 90 at a viewing location 93. An optical sensing block 92 having an upper surface 94 being flush with the upper surface 87 of bed plate 88 is mounted in the aperture 90, the upper surface 94 being made of light transparent material. The optical sensing block 92 is connected to the light measuring unit 74 as will be hereunder explained. This light measuring unit consists of a spectrophotometer comprising a light source 96 providing a light output 98 which is conducted toward upper surface 87 of optical sensing block 92 by a first light guide (not shown), such as a fiber optic cable, such a light guide being well known in the art. The light source is chosen in such a manner that the light output 98 comprises the pair of wavelengths selected from a plurality of light reflection curves in terms of a reflected light wavelength spectrum, as earlier explained in reference to FIG. 1. The light output then reaches upper surface 94 of the sensing block 92, preferably at an angle of 45 degrees with reference to the upper surface 94. A second light guide (not shown) collects and directs the a reflected light beam 100 from an area 101 of the underside of article 82 under inspection toward to a spectrophotometer grating 102. As well known in the art, the grating 102 spreads the reflected light beam 100 in wavelength components forming the continuous reflected light spectrum. These wavelength components are then directed to a respective photodetector of an array of photodetectors 103, a CCD linear array in one particular instance, and a plurality of analog signals, which are proportional to the intensity values of reflected light corresponding to a respective wavelength component, are fed to an electronic interface 106 through cable 104. The electronic interface 106 processes and converts analog reflected light signals to digital serial or parallel signals which are then fed to the computer 78 through link 108. A power unit 110 connected to an electrical power source 112 supplies appropriate voltage levels for the operation of the electronic interface 106 and computer 78 through link 109.

The computer 78 selects those digital reflected light signals corresponding to each wavelength of the selected pair of wavelengths, and produces a signal representing either a difference between or a ratio of said detected light refection values, such a signal being indicative of the color of the inspected article. Such color signal can then be displayed on a display (not shown) connected to the computer 78, or fed to another electronic device for further processing. As earlier mentioned, an example of such further processing consists of classifying articles to be inspected in a respective one of a plurality of the color classes. In such an application, the computer is used to carry out the classification method as earlier described in detail, to produce primary, secondary and tertiary color signals, so as to define a classification frame, and to classify each inspected article in a respective one of the color classes. After a given article has been classified, and upon reception by the computer of a control signal from a presence detector (not shown) connected thereto, the computer 78 sends a signal representing the selected color class to a marking head 116 securely mounted in a second aperture 117 provided through the bed plate 88 of the apparatus. The marking head 116 immediately prints an identification mark, e.g., an alphanumeric code and/or bar code, on the inspected article, which corresponds to the selected class for this specific article that can be later manually or automatically sorted. Moreover, whenever a color signal does not comply with the classification conditions as earlier stated, a rejection mark can be printed on such an article. It is further pointed out that the marking step can be omitted by providing an automatic sorting unit (not shown) to be connected to the computer 78 and being coupled at the output end 118 of the apparatus, such sorting unit being currently available on the market.

Figure 5:
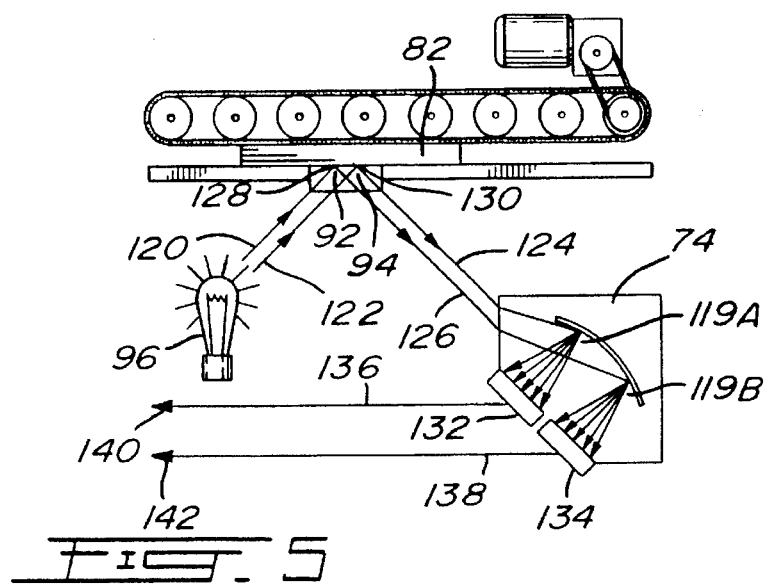
FIG. 5 is a schematic diagram showing a dual gratings spectrophotometer that could be used according to the present invention.
Figure 5A:
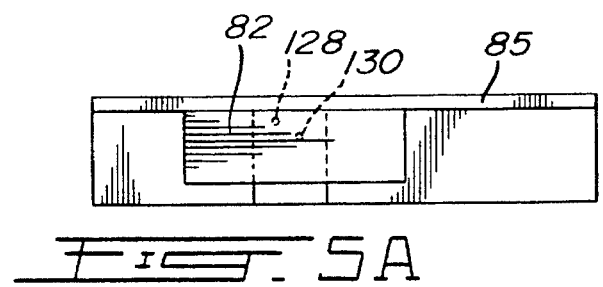
FIG. 5a is a plan view of the article conveyer as shown in FIG. 5.

Attention is now directed to FIG. 5, which shows a partial schematic diagram of another example of the apparatus according to the present invention, wherein measurement unit 74 comprises a dual gratings spectrophotometer as designated at numerals 119A and 119B. The light source 96 provides two light outputs 120 and 122 which are conducted toward upper surface 94 of optical sensing block 92 respectively by first and second light guides (not shown), such as fiber optic cables. Light outputs 120 and 122 then reach upper surface 94 of sensing block 92 preferably at an angle of 45 degrees with reference to the upper surface 94. A third and fourth light guides (not shown) respectively collect and direct reflected light beam 124 and 126 from areas 128 and 130 of the underside of article 82 under inspection, as better shown in FIG. 5A, toward gratings 119A and 119B. Gratings 119A and 119B respectively reflected light beams 124 and 126 in wavelength components constituting the continuous reflected light spectrum. The spread wavelength components are then directed to a respective array of a pair of linear arrays of optical sensors 132 and 134, a pair of CCD linear arrays in the particular instance, and the two groups of analog signals so produced are directed to the electronic interface through cables 136 and 138, as indicated by arrows 140 and 142. The apparatus configuration as shown in FIGS. 5 and 5A provides color sensing associated with areas which are not aligned in the moving direction of the article under inspection, as clearly shown in FIG. 5A. Therefore, in the case when articles to be inspected are characterized by a non uniform color over their surface, more representative color signals can be obtained through averaging reflected light measurements based on a plurality of areas on the inspected articles, which areas need not absolutely be aligned thereon.

Figure 6:
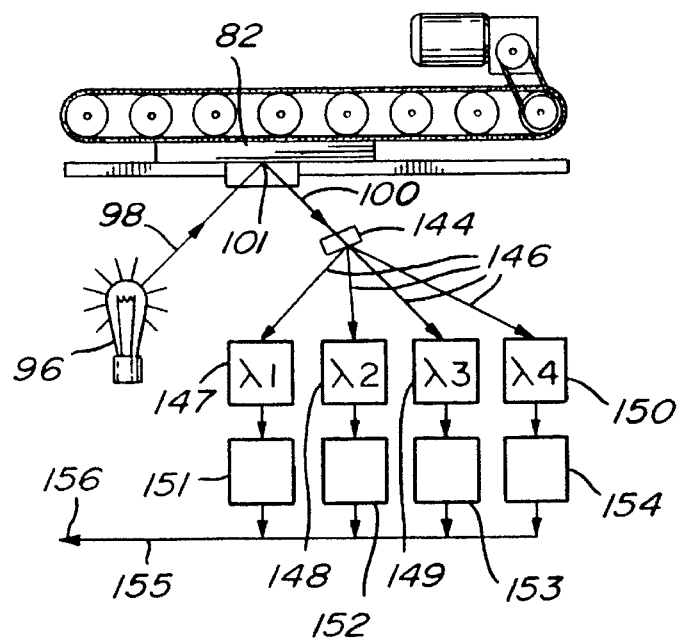
FIG. 6 is a schematic diagram showing an alternate light measuring device according to the present invention which comprises a beam splitter followed by a series of optical filters respectively connected thereto.

Referring now to FIG. 6, there is illustrated an alternative device for the light measurement unit according to the present invention. A beam splitter 144 is provided for receiving the reflected beam of light 100 from the area 101 of the article underside to be inspected, and for splitting the incoming beam in a plurality of substantially identical reflected light beams 146. Each of these beams is directed to a respective one of a plurality of bandpass optical filters, identified in the particular instance at numerals 147, 148, 149 and 150, the bandwidth of which are centered at a respective wavelength, namely $\lambda_1$, $\lambda_2$, $\lambda_3$ and $\lambda_4$, these wavelengths being selected as earlier explained. A different number of these filters could be required depending upon the sensing or classifying method used. Beams of reflected light passing through filters 147, 148, 149, and 150 are then directed to a respective one of a plurality of photodetectors 151, 152, 153, and 154, such as photodiodes or equivalent semiconductor devices. Reflected light analog signals produced by theses photodetectors are then directed to the electronic interface through link 155, as indicated by the arrow 156.

Figure 7:
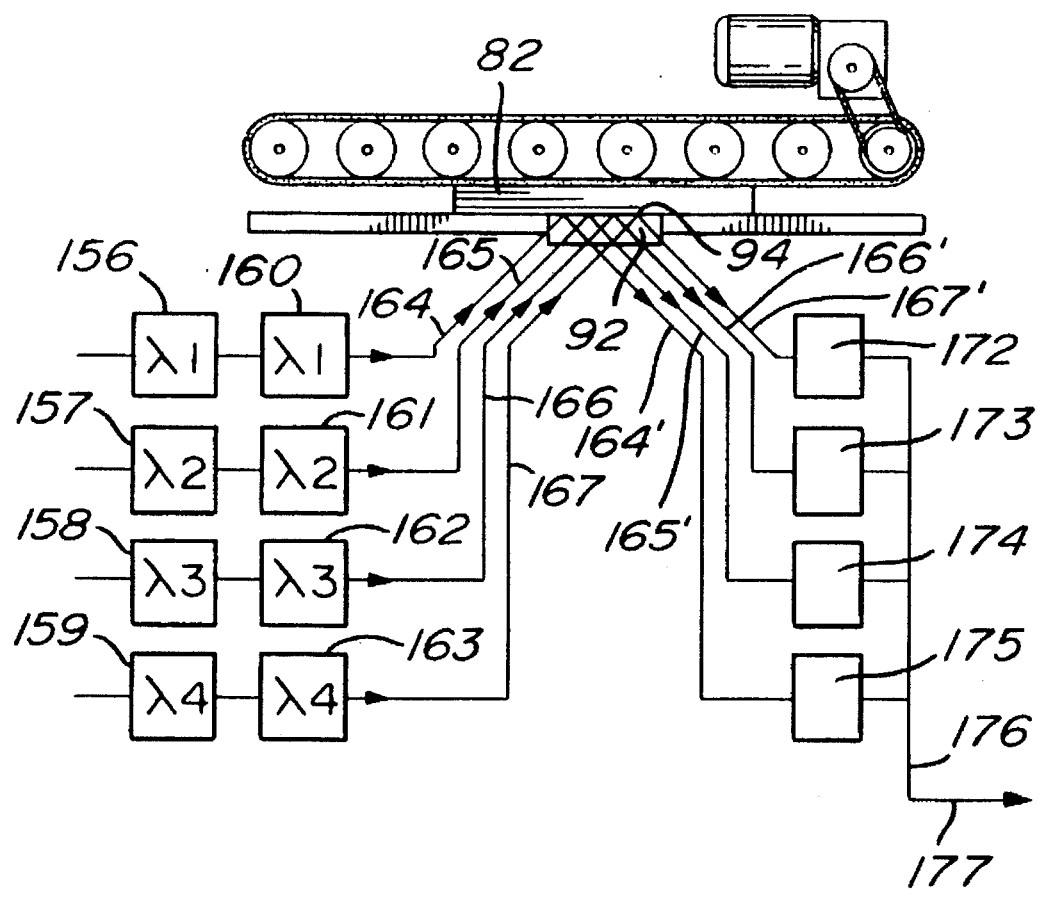
FIG. 7 is a schematic diagram showing an alternate light illumination and measuring device according to the present invention which respectively comprises a series of light sources respectively providing a plurality of light outputs, and a series of photodetectors for respectively detecting these light outputs.
Figure 7A:
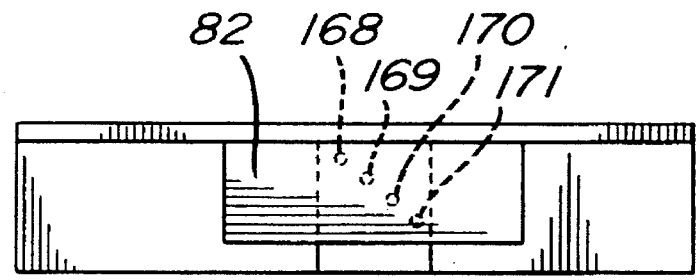
FIG. 7a is a plan view of the article conveyer as shown in FIG. 7.

Referring now to FIGS. 7, there is shown an alternate light source and measurement device according to the present invention. A plurality of light sources, such as laser diodes, as indicated in the particular instance at numerals 156, 157, 158 and 159, are provided. These light sources are chosen in a such manner their respective bandwidth comprises one of wavelengths associated with a selected pair of wavelengths or one of the secondary or tertiary wavelengths as selected according to the method as earlier explained, namely $\lambda_1$, $\lambda_2$, $\lambda_3$ and $\lambda_4$. Each of these light sources is aligned with a respective filter of a series of bandpass optical filters 160, 161, 162 and 163, the bandwidth of which are respectively centered on $\lambda_1$, $\lambda_2$, $\lambda_3$ and $\lambda_4$. It is noted that a different number of these light sources and associated optical filters could be required depending upon the sensing or classifying method as used. The light sources 156, 157, 158 and 159 provide respectively four light outputs 164, 165, 166 and 167, which are conducted toward upper surface 94 of optical sensing block 92 respectively by a first series of four light guides (not shown), such as fiber optic cables. Light outputs 164, 165, 166, and 167 then reach upper surface 94 of sensing block 92 preferably at an angle of 45 degrees with reference to the upper surface 94. A second series of light guides (not shown) respectively collect and direct reflected light beams 164', 165', 166', and 167' from areas 168, 169, 170 and 171 of the underside of article 82 under inspection, as better shown in FIG. 7A, toward photodetectors 172, 173, 174, and 175. Reflected light analog signals produced by theses photodetectors are then directed to the electronic interface through link 176, as indicated by the arrow 177.

It is to be understood that any other equivalent configuration of light sources, optical filters and photodetecting devices should be considered as being within the scope of the present invention.

We claim:

1. A method for classifying articles according to their color comprising steps of:

selecting a first pair of wavelengths on a plurality of light reflection curves in terms of a reflected light wavelength spectrum;

illuminating with light comprising said first pair of wavelengths an area of one of said articles;

measuring light reflected from said area of one of said articles at said first pair of wavelengths to obtain detected light reflection values corresponding to said first pair of wavelengths;

producing a primary signal representing a resulting difference between said detected light reflection values, said signal being indicative of the color of said one of said articles;

selecting at least one secondary wavelength on said reflected light wavelength spectrum;

illuminating with light comprising said at least one secondary wavelength said area of said one of said articles;

measuring light reflected from said area at said at least one secondary wavelength to produce a secondary signal; said secondary signal being further indicative of the color of said one of said articles;

providing a classification frame comprising a pattern consisting of first and second crossing sets of lines respectively defined by mathematical analysis, said classification frame defining a plurality of color classes;

classifying said one of said articles in a color class of said plurality of color classes defined by said frame, whenever said primary and secondary signals comply with a specific condition; and rejecting said one of said articles whenever said primary and secondary signals do not comply with said specific condition; and wherein said first and second crossing sets of lines are respectively defined by:

$$R2_i = m_1(R1_i - R1_{0i}) + R2_{0i}$$

and $$R2_j = m_2(R1_j - R1_{0j}) + R2_{0j}$$

wherein $R1_i$ is a threshold value for said primary signal on a first axis corresponding to a line i of said first set of lines, i=1,n and n>2;

$R1_j$ is a threshold value for said primary signal on a first axis corresponding to a line j of said first set of lines, j=1,m and m>2;

$R1_{0i}$ is the origin threshold value for said primary signal on said first axis corresponding to the line i of said first set of lines;

$R1_{0j}$ is the origin threshold value for said primary signal on said first axis corresponding to the line j of said first set of lines;

$R2_i$ is a threshold value for said secondary signal on a second axis corresponding to a line i of said second set of lines, i=1,n and n>2;

$R2_j$ is a threshold value for said secondary signal on a second axis corresponding to a line j of said second set of lines, j=1,m and m>2;

$R2_{0i}$ is the origin threshold value for said secondary signal on said second axis corresponding to the line i of said second set of lines;

$R2_{0j}$ is the origin threshold value for said secondary signal on said second axis corresponding to the line j of said second set of lines;

$m_1$ is a slope parameter for the line i of said first set of lines, and being a positive value;

$m_2$ is a slope parameter for the line j of said second set of lines, and being a positive value, and wherein $R1_{0i=1}$ and $R2_{0i=1}$ are respectively equal to $R1_{0j=1}$ and $R2_{0j=1}$; and wherein said specific condition is defined by:

$$\left(\frac{r2 - R2_{0i}}{m_1}\right) + R1_{0i} < r1 < \left(\frac{r2 - R2_{0i+1}}{m_1}\right) + R1_{0i+1}$$

and $$-m_2(r1 - R1_{0j}) + R2_{0j} < R2 < -m_2(r1 - R1_{oj+1}) + R2_{0j+1}$$

wherein $C_{ij}$ is the class delimited by the line i and a line i+1 of said first set of lines and the line j and a line j+1 of said second set of lines, and wherein i<n−1, j<m−1;

r1 is said primary signal indicative of the color of said one of said articles; and r2 is said secondary signal further indicative of the color of said one of said articles.

2. A method for classifying articles according to their color comprising steps of:

selecting first and second pairs of wavelengths on a plurality of light reflection curves in terms of reflected light wavelength spectrum;

illuminating with light comprising said first and second pairs of wavelengths an area of one of said articles;

measuring light reflected from said area of one of said articles at said first and second pairs of wavelengths to obtain detected light reflection values corresponding to said first and second pairs of wavelengths;

producing respectively first and second primary signals representing a resulting difference between said detected light reflection values, said primary signals being indicative of the color of said one of said articles;

providing a classification frame comprising a pattern consisting of first and second crossing sets of lines respectively defined by mathematical analysis, said classification frame defining a plurality of color classes;

classifying said one of said articles in a color class of said plurality of color classes defined by said frame, whenever said first and second primary signals comply with a specific condition; and rejecting said one of said articles whenever said first primary and second primary signals do not comply with said specific condition; wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for said first primary signal on a first axis corresponding to a line i of said first set of lines, i=1,n and n>2;

$R1_j$ is a threshold value for said first primary signal on a first axis corresponding to a line j of said first set of lines, j=1,m and m>2;

$R1_{0i}$ is the origin threshold value for said first primary signal on said first axis corresponding to the line i of said first set of lines;

$R1_{0j}$ is the origin threshold value for said first primary signal on said first axis corresponding to the line j of said first set of lines;

$R2_i$ is a threshold value for said second primary signal on a second axis corresponding to a line i of said second set of lines, i=1,n and n>2;

$R2_j$ is a threshold value for said second primary signal second axis corresponding to a line j of said second set of lines, j=1,m and m>2;

$R2_{0i}$ is the origin threshold value for said second primary signal on said second axis corresponding to the line i of said second set of lines;

$R2_{0j}$ is the origin threshold value for said second primary signal on said second axis corresponding to the line j of said second set of lines;

$m_1$ is a slope parameter for the line i of said first set of lines, and being a positive value;

$m_2$ is a slope parameter for the line j of said second set of lines, and being a positive value, and wherein $R1_{0i=1}$ and $R2_{0i=1}$ are respectively equal to $R1_{0j=1}$ and $R2_{0j=1}$; and wherein said specific condition is defined by:

$$\left(\frac{r2 - R2_{0i}}{m_1}\right) + R1_{0i} < r1 < \left(\frac{r2 - R2_{0i+1}}{m_1}\right) + R1_{0i+1}$$

and $$-m_2(r1 - R1_{0j}) + R2_{0j} < r2 < -m_2(r1 - R1_{oj+1}) + R2_{0j+1}$$

wherein $C_{ij}$ is the class delimited by the line i and a line i+1 of said first set of lines and the line j and a line j+1 of said second set of lines, and wherein i<n−1, j<m−1;

r1 is said first primary signal indicative of the color of said one of said articles; and r2 is said second primary signal further indicative of the color of said one of said articles.

3. A method for classifying articles according to their color comprising steps of:

selecting a pair of wavelengths on a plurality of light reflection curves in terms of a reflected light wavelength spectrum;

illuminating with light comprising said pair of wavelengths an area of one of said articles;

measuring light reflected from said area of one of said articles at a said pair of wavelengths to obtain detected light reflection values corresponding to said pair of wavelengths;

producing a primary signal representing a resulting difference between said detected light reflection values, said signal being indicative of the color of said one of said articles;

selecting at least one secondary wavelength on said reflected light wavelength spectrum;

illuminating with light comprising said at least one secondary wavelength said area of said one of said articles;

measuring light reflected from said area at said at least one secondary wavelength to produce a secondary signal; said secondary signal being further indicative of the color of said one of said articles;

selecting at least one tertiary wavelength on said reflected light wavelength spectrum, said at least one tertiary wavelength having a substantially different value compared to said at least one secondary wavelength;

illuminating with light comprising said at least one tertiary wavelength said area of said one of said articles;

measuring light reflected from said area at said at least one tertiary wavelength to produce a tertiary signal, said tertiary signal being further indicative of the color of said one of said articles;

providing a classification frame comprising:

a first pattern consisting of first and second crossing sets of respective lines i and lines j, i=1,n and n≧2, j=1,m and m≧2, said sets being defined by mathematical analysis, said first pattern laying in a plane intersecting a third axis at a point $R3_0$ which is a first threshold value for said tertiary signal on said third axis;

a second pattern consisting of third and fourth crossing sets of respective lines i and lines j, i=1,n and n≧2, j=1,m and m≧2, said sets being defined by mathematical analysis, said second pattern laying in a plane intersecting said third axis at a point $R3^*_0$ which is a second threshold value for said tertiary signal on said third axis, with $R3^*_0 > R3_0$;

first and second sets of surfaces, wherein said first set comprises surfaces respectively intersecting lines i of said first set of lines with corresponding lines i of said third set of lines, said second set comprising surfaces respectively intersecting lines j of said second set of lines with corresponding lines j of said fourth set of lines, thereby defining a first stage of (n−1)(m−1) color classification cells delimiting a respective classification space therein, classifying said one of said articles in a color class $C_{i,j}$; associated with a respective one of said cells, whenever said primary signal, said secondary signal and said tertiary signal corresponding to said area of one of said article define a point located inside said one of said classification cells, classifying said one of said articles in the color class $C_{ij}$ having values of i and j associated with a respective one of adjacent cells, whenever said primary signal, said secondary signal and said tertiary signal corresponding to said area of one of said article define a point located in one or more of said surfaces defining said adjacent cells; and rejecting said one of said articles whenever said primary signal, said secondary signal and said tertiary signal define a point located outside all of said classification cells, and outside all of said surfaces defining said adjacent cells.

4. A method for classifying articles according to their color according to claim 3, wherein said first and second crossing sets of lines are respectively defined by:

$$R2_i = m_1(R1_i - R1_{0i}) + R2_{0i}$$

and $$R2_j = -m_2(R1_{0j} - R1_{0j}) + R2_{0j}$$

wherein $R1_i$ is a threshold value for said primary signal on a first axis corresponding to a line i of said first set of lines, i=1,n and n≧2;

$R1_j$ is a threshold value for said primary signal on a first axis corresponding to a line j of said first set of lines, j=1,m and m≧2;

$R1_{0i}$ is the origin threshold value for said primary signal on said first axis corresponding to the line i of said first set of lines;

$R1_{0j}$ is the origin threshold value for said primary signal on said first axis corresponding to the line j of said first set of lines;

$R2_i$ is a threshold value for said secondary signal on a second axis corresponding to a line i of said second set of lines, i=1,n and n≧2;

$R2_j$ is a threshold value for said secondary signal on a second axis corresponding to a line j of said second set of lines, j=1,m and m≧2;

$R2_{0i}$ is the origin threshold value for said secondary signal on said second axis corresponding to the line i of said second set of lines;

$R2_{0j}$ is the origin threshold value for said secondary signal on said second axis corresponding to the line j of said second set of lines;

$m_1$ is a slope parameter for the line i of said first set of lines, and being a positive value;

$m_2$ is a slope parameter for the line j of said second set of lines, and being a positive value, and wherein $R1_{0i=1}$ and $R2_{0i=1}$ are respectively equal to $R1_{0j=1}$ and $R2_{0j=1}$;

wherein said third and fourth crossing sets of lines are respectively defined by:

$$R2^*_i = m_3(R1^*_i - R1^*_{0i}) + R2^*_{0i}$$

and $$R2^*_j = -m_4(R1^*_j - R1^*_{0j}) + R2^*_{0j}$$

wherein $R1^*_i$ is a threshold value for said primary signal on said first axis corresponding to a line i of said third set of lines, i=1,n and n≧2;

$R1^*_j$ is a threshold value for said primary signal on said first axis corresponding to a line j of said third set of lines, j=1,m and m≧2;

$R1_{0i}$ is the origin threshold value for said primary signal on said first axis corresponding to the line i of said third set of lines;

$R1^*_{0j}$ is the origin threshold value for said primary signal on said first axis corresponding to the line j of said third set of lines;

$R2^*_i$ is a threshold value for said secondary signal on said second axis corresponding to a line i of said fourth set of lines, i=1,n and n≧2;

$R2^*_j$ is a threshold value for said secondary signal on said second axis corresponding to a line j of said fourth set of lines, j=1,m and m≧2;

$R2^*_{0i}$ is the origin threshold value for said secondary signal on said second axis corresponding to the line i of said fourth set of lines;

$R2_{0j}$ is the origin threshold value for said secondary signal on said second axis corresponding to the line j of said fourth set of lines;

$m_3$ is a slope parameter for the line i of said third set of lines, and being substantially equal to said slope parameter $m_1$;

$m_4$ is a slope parameter for the line j of said fourth set of lines, and being substantially equal to said slope parameter $m_2$, and wherein $R1^*_{0i=1}$ and $R2^*_{0i=1}$ are respectively equal to $R^{*1}_{0j=1}$ and $R2^*_{0j=1}$;

and wherein $$R1_{0i+1} - R1_{0i} = R1^*_{0i+1} - R1^*_{0i} \text{ for } i=1,n$$

and $$R2_{0j+1}-R2_{0j}=R2^*_{0j+1}-R2^*_{0j} \text{ for } j=1,m.$$

5. A method for classifying articles according to their color as claimed in claim 4, wherein $R1_{0i=1}$ is substantially different from $R1^*_{0i=1}$, and wherein $R2_{0i=1}$ is substantially different from $R2^*_{0i=1}$.

6. A method for classifying articles according to their color comprising steps of:

selecting first and second pairs of wavelengths on a plurality of light reflection curves in terms of a reflected light wavelength spectrum;

illuminating with light comprising said first and second pairs of wavelengths an area of one of said articles;

measuring light reflected from said area of one of said articles at said first and second pairs of wavelengths to obtain detected light reflection values corresponding to said first and second pairs of wavelengths;

producing respectively first and second primary signals representing a resulting difference between said detected light reflection values, said signals being indicative of the color of said one of said articles;

selecting at least one tertiary wavelength on said reflected light wavelength spectrum;

illuminating with light comprising said at least one tertiary wavelength said area of said one of said articles;

measuring light reflected from said area at said at least one tertiary wavelength to produce a tertiary signal, said tertiary signal being further indicative of the color of said one of said articles;

providing a classification frame comprising:

a first pattern consisting of first and second crossing sets of respective lines i and lines j, i=1,n and n≥2, j=1,m and m≥2, said sets being defined by mathematical analysis, said first pattern laying in a plane intersecting a third axis at a point $R3_0$ which is a first threshold value for said tertiary signal on said third axis;

a second pattern consisting of third and fourth crossing sets of respective lines i and lines j, i=1,n and n≥2, j=1,m and m≥2, said sets being defined by mathematical analysis, said second pattern laying in a plane intersecting said third axis at a point $R3^*_0$ which is a second threshold value for said tertiary signal on said third axis, with $R3^*_0 > R3_0$;

first and second sets of surfaces wherein said first set comprises surfaces respectively intersecting lines i of said first set of lines with corresponding lines i of said third set of lines, said second set comprising surfaces respectively intersecting lines j of said second set of lines with corresponding lines j of said fourth set of lines, thereby defining a first stage of (n−1)(m−1) color classification cells delimiting a respective classification space therein, classifying said one of said articles in a color class associated with a respective one of said cells, whenever said first and second primary signals and said tertiary signal corresponding to said area of one of said article define a point located inside said one of said classification cells, classifying said one of said articles in the color class $C_{ij}$ having values of i and j associated with a respective one of adjacent cells, whenever said first and second primary signals and said tertiary signal corresponding to said area of one of said article define a point located in one or more of said surfaces defining said adjacent cells, and rejecting said one of said articles whenever said first and second primary signals and said tertiary signal define a point located outside all of said classification cells and outside all of said surfaces defining said adjacent cells.

7. A method for classifying articles according to their color according to claim 6, wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for said first primary signal on a first axis corresponding to a line i of said first set of lines, i=1,n and n≥2;

$R1_j$ is a threshold value for said first primary signal on a first axis corresponding to a line j of said first set of lines, j=1,m and m≥2;

$R1_{0i}$ is the origin threshold value for said first primary signal on said first axis corresponding to the line i of said first set of lines;

$R1_{0j}$ is the origin threshold value for said first primary signal on said first axis corresponding to the line j of said first set of lines;

$R2_i$ is a threshold value for said second primary signal on a second axis corresponding to a line i of said second set of lines, i=1,n and n≥2;

$R2_j$ is a threshold value for said second primary signal on a second axis corresponding to a line j of said second set of lines, j=1,m and m≥2;

$R2_{0i}$ is the origin threshold value for said second primary signal on said second axis corresponding to the line i of said second set of lines;

$R2_{0j}$ is the origin threshold value for said second primary signal on said second axis corresponding to the line j of said second set of lines;

$m_1$ is a slope parameter for the line i of said first set of lines, and being a positive value;

$m_2$ is a slope parameter for the line j of said second set of lines, and being a positive value, and wherein $R1_{0i=1}$ and $R2_{0i=1}$ are respectively equal to $R1_{0j=1}$ and $R2_{0j=1}$;

wherein said third and fourth crossing sets of lines are respectively defined by:

$$R2^*_i = m_3(R1^*_i - R1^*_{0i}) + R2^*_{0i}$$

and $$R2^*_j = -m_4(R1^*_j - R1^*_{0j}) + R2^*_{0j}$$

wherein $R1^*_i$ is a threshold value for said first primary signal on said first axis corresponding to a line i of said third set of lines, i=1,n and n≥2;

$R1^*_j$ is a threshold value for said first primary signal on said first axis corresponding to a line j of said third set of lines, j=1,m and m≥2;

$R1_{0i}$ is the origin threshold value for said primary signal on said first axis corresponding to the line i of said third set of lines;

$R1^*_{0j}$ is the origin threshold value for said primary signal on said first axis corresponding to the line j of said third set of lines;

$R2^*_i$ is a threshold value for said second primary signal on said second axis corresponding to a line i of said fourth set of lines, $i=1,n$ and $n \geq 2$;

$R2^*_j$ is a threshold value for said second primary signal on said second axis corresponding to a line j of said fourth set of lines, $j=1,m$ and $m \geq 2$;

$R2_{0i}$ is the origin threshold value for said second primary signal on said second axis corresponding to the line i of said fourth set of lines;

$R2^*_{0j}$ is the origin threshold value for said second primary signal on said second axis corresponding to the line j of said fourth set of lines;

$m_3$ is a slope parameter for the line i of said third set of lines, and being substantially equal to said slope parameter $m_1$;

$m_4$ is a slope parameter for the line j of said fourth set of lines, and being substantially equal to said slope parameter $m_2$, and wherein $R^{*1}_{0i=1}$ and $R2^*_{0i=1}$ are respectively equal to $R1^*_{0j=1}$ and $R2^*_{0j=1}$;

and wherein $$R1_{0i+1} - R1_{0i} = R1^*_{0i+1} - R1^*_{0i} \text{ for } i=1,n$$

and $$R2_{0j+1} - R2_{0j} = R^*2_{0j+1} - R2^*_{0j} \text{ for } j=1,m.$$

8. A method for classifying articles according to their color as claimed in claim 7, wherein R1 is substantially different from $R1^*_{0i=1}$, or wherein $R2_{0i=1}$ is substantially different from $R2^*_{0i=1}$.

9. A method for classifying articles according to their color comprising steps of:

selecting a pair of wavelengths on a plurality of light reflection curves in terms of a reflected light wavelength spectrum;

illuminating with light comprising said pair of wavelengths an area of one of said articles;

measuring light reflected from said area of one of said articles at a said pair of wavelengths to obtain detected light reflection values corresponding to said pair of wavelengths;

producing a primary signal representing a resulting difference between said detected light reflection values, said signal being indicative of the color of said one of said articles;

selecting at least one secondary wavelength on said reflected light wavelength spectrum;

illuminating with light comprising said at least one secondary wavelength said area of said one of said articles;

measuring light reflected from said area at said at least one secondary wavelength to produce a secondary signal; said secondary signal being further indicative of the color of said one of said articles;

selecting at least one tertiary wavelength on said reflected light wavelength spectrum, said at least one tertiary wavelength having a substantially different value compared to said at least one secondary wavelength;

illuminating with light comprising said at least one tertiary wavelength said area of said one of said articles;

measuring light reflected from said area at said at least one tertiary wavelength to produce a tertiary signal, said tertiary signal being further indicative of the color of said one of said articles;

providing a classification frame comprising:

a first pattern consisting of first and second crossing sets of respective lines i and lines j, $i=1,n$ and $n \geq 2$, $j=1,m$ and $m \geq 2$, said sets being defined by mathematical analysis, said first pattern laying in a plane intersecting a third axis at a point $R3_0$ which is a first threshold value for said tertiary signal on said third axis;

a second pattern consisting of third and fourth crossing sets of respective lines i and lines j, $i=1,n$ and $n \geq 2$, $j=1,m$ and $m \geq 2$, said sets being defined by mathematical analysis, said second pattern laying in a plane intersecting said third axis at a point $R3^*_0$ which is a second threshold value for said tertiary signal on said third axis, with $R3^*_0 > R3_0$;

first and second sets of surfaces wherein said first set comprises surfaces respectively intersecting lines i of said first set of lines with corresponding lines i of said third set of lines, said second set comprising surfaces respectively intersecting lines j of said second set of lines with corresponding lines j of said fourth set of lines, thereby defining a first stage of $(n-1)(m-1)$ color classification cells delimiting a respective classification space therein;

classifying said one of said articles in a color class $C_{ij}$ associated with a respective one of said cells, whenever said primary signal, said secondary signal and said tertiary signal corresponding to said area of one of said article define a point located inside said one of said classification cells;

classifying said one of said articles in the color class $C_{ij}$ having either values of i and j associated with a respective one of adjacent cells, whenever said primary signal, said secondary signal and said tertiary signal corresponding to said area of one of said article define a point located in one or more of said surfaces defining said adjacent cells;

classifying said one of said articles in a color class $C^*_{ij}$ of a plurality of complementary color classes defined by said second pattern, whenever said tertiary signal is equal to or greater than $R3^*_0$ and said primary signal and said secondary signal comply with a specified condition; and rejecting said one of said articles whenever said primary signal, said secondary signal and said tertiary signal do not comply with said specific condition and define a point located outside all of said classification cells and outside all of said surfaces defining said adjacent cells.

10. A method for classifying articles according to their color according to claim 9, wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for said primary signal on a first axis corresponding to a line i of said first set of lines, i=1,n and n≧2;

$R1_j$ is a threshold value for said primary signal on a first axis corresponding to a line j of said first set of lines, j=1,m and m≧2;

$R1_{0i}$ is the origin threshold value for said primary signal on said first axis corresponding to the line i of said first set of lines;

$R1_{0j}$ is the origin threshold value for said primary signal on said first axis corresponding to the line j of said first set of lines;

$R2_i$ is a threshold value for said secondary signal on a second axis corresponding to a line i of said second set of lines, i=1,n and n≧2;

$R2_j$ is a threshold value for said secondary signal on a second axis corresponding to a line j of said second set of lines, j=1,m and m≧2;

$R2_{0i}$ is the origin threshold value for said secondary signal on said second axis corresponding to the line i of said second set of lines;

$R2_{0j}$ is the origin threshold value for said secondary signal on said second axis corresponding to the line j of said second set of lines;

$m_1$ is a slope parameter for the line i of said first set of lines, and being a positive value;

$m_2$ is a slope parameter for the line j of said second set of lines, and being a positive value, and wherein $R1_{0i=1}$ and $R2_{0i=1}$ are respectively equal to $R1_{0j=1}$ and $R2_{0j=1}$;

wherein said third and fourth crossing sets of lines are respectively defined by:

$$R2^*_i = m_3(R1^*_i - R1^*_{0i}) + R2^*_{0i}$$

and $$R2^*_j = -m_4(R1^*_j - R1^*_{0j}) + R2^*_{0j}$$

wherein $R1^*_i$ is a threshold value for said primary signal on said first axis corresponding to a line i of said third set of lines, i=1,n and n≧2;

$R1^*_j$ is a threshold value for said primary signal on said first axis corresponding to a line j of said third set of lines, j=1,m and m≧2;

$R1^*_{0i}$ is the origin threshold value for said primary signal on said first axis corresponding to the line i of said third set of lines;

$R1^*_{0j}$ is the origin threshold value for said primary signal on said first axis corresponding to the line j of said third set of lines;

$R2^*_i$ is a threshold value for said secondary signal on said second axis corresponding to a line i of said fourth set of lines, i=1,n and n≧2;

$R2^*_j$ is a threshold value for said secondary signal on said second axis corresponding to a line j of said fourth set of lines, j=1,m and m≧2;

$R2^*_{0i}$ is the origin threshold value for said secondary signal on said second axis corresponding to the line i of said fourth set of lines;

$R2^*_{0j}$ is the origin threshold value for said secondary signal on said second axis corresponding to the line j of said fourth set of lines;

$m_3$ is a slope parameter for the line i of said third set of lines, and being substantially equal to said slope parameter $m_1$;

$m_4$ is a slope parameter for the line j of said fourth set of lines, and being substantially equal to said slope parameter $m_2$, and wherein $R1^*_{0i=1}$ and $R2^*_{0i=1}$ are respectively equal to $R^{*1}_{0\,j=1}$ and $R2^*_{0j=1}$;

wherein $$R1_{0i+1} - R1_{0i} = R1^*_{0i+1} - R1^*_{0i} \text{ for } i=1,n$$

and $$R2_{0j+1} - R2_{0j} = R2^*_{0j+1} - R2^*_{0j} \text{ for } j=1,m;$$

and wherein said specific condition is defined by:

$$\left(\frac{r2 - R2^*_{0i}}{m_3}\right) + R1^*_{0i} \leq r1 < \left(\frac{r2 - R2^*_{0i+1}}{m_3}\right) + R1^*_{0i+1}$$

and $$-m_4(r1 - R1^*_{0j}) + R2^*_{0j} \leq r2 < -m_4(r1 - R1^*_{0j+1}) + R2^*_{0j+1}$$

wherein $C^*_{ij}$ the class delimited by the line i and a line i+1 of said third set of lines and the line j and a line j+1 of said fourth set of lines, and wherein i≦n−1, j≦m−1;

r1 is said primary signal indicative of the color of said one of said articles;

r2 is said secondary signal further indicative of the color of said one of said articles.

11. A method for classifying articles according to their color as claimed in claim 9, wherein said curves are associated with a plurality of said articles constituting a sample representative of a color range to be sensed, said first pair of wavelengths delimiting a first range of wavelengths corresponding to light reflection values in said curves, said light reflection values in each of said curves being in a substantially linear relationship over said first range of wavelengths.

12. A method for classifying articles according to their color comprising steps of:

selecting first and second pairs of wavelengths on a plurality of light reflection curves in terms of a reflected light wavelength spectrum;

illuminating with light comprising said first and second pairs of wavelengths an area of one of said articles;

measuring light reflected from said area of one of said articles at said first and second pairs of wavelengths to obtain detected light reflection values corresponding to said first and second pairs of wavelengths;

producing respectively first and second primary signals representing a resulting difference between said detected light reflection values, said signals being indicative of the color of said one of said articles;

selecting at least one tertiary wavelength on said reflected light wavelength spectrum;

illuminating with light comprising said at least one tertiary wavelength said area of said one of said articles;

measuring light reflected from said area at said at least one tertiary wavelength to produce a tertiary signal, said tertiary signal being further indicative of the color of said one of said articles;

providing a classification frame comprising:
- a first pattern consisting of first and second crossing sets of respective lines i and lines j, i=1,n and n≧2, j=1,m and m≧2, said sets being defined by mathematical analysis, said first pattern laying in a plane intersecting a third axis at a point $R3_0$ which is a first threshold value for said tertiary signal on said third axis;
- a second pattern consisting of third and fourth crossing sets of respective lines i and lines j, i=1,n and n≧2, j=1,m and m≧2, said sets being defined by mathematical analysis, said second pattern laying in a plane intersecting said third axis at a point $R3^*_0$ which is a second threshold value for said tertiary signal on said third axis, with $R3^*_0 > R3_0$;
- first and second sets of surfaces wherein said first set comprises surfaces respectively intersecting lines i of said first set of lines with corresponding lines i of said third set of lines, said second set comprising surfaces respectively intersecting lines j of said second set of lines with corresponding lines j of said fourth set of lines, thereby defining a first stage of (n−1)(m−1) color classification cells delimiting a respective classification space therein;
- classifying said one of said articles in a color class $C_{ij}$ associated with a respective one of said cells, whenever said first and second primary signals and said tertiary signal corresponding to said area of one of said article define a point located inside said one of said classification cells;
- classifying said one of said articles in the color class $C_{ij}$ having values of i and j associated with a respective one of adjacent cells, whenever said first and second primary signals and said tertiary signal corresponding to said area of one of said article define a point located in one or more of said surfaces defining said adjacent cells;
- classifying said one of said articles in a color class of a plurality of complementary color classes defined by said second pattern, whenever said tertiary signal is equal to or greater than $R3^*_0$ and said first and second primary signals comply with a specific condition, and
- rejecting said one of said articles whenever said primary signal, said secondary signal and said tertiary signal do not comply with said condition and define a point located outside all of said classification cells and outside said surfaces defining said adjacent cells.

13. A method for classifying articles according to their color according to claim 12, wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein
- $R1_i$ is a threshold value for said first primary signal on a first axis corresponding to a line i of said first set of lines, i=1,n and n≧2;
- $R1_j$ is a threshold value for said first primary signal on a first axis corresponding to a line j of said first set of lines, j=1,m and m≧2;
- $R1_{0i}$ is the origin threshold value for said first primary signal on said first axis corresponding to the line i of said first set of lines;
- $R1_{0j}$ is the origin threshold value for said first primary signal on said first axis corresponding to the line j of said first set of lines;
- $R2_i$ is a threshold value for said second primary signal on a second axis corresponding to a line i of said second set of lines, i=1,n and n≧2;
- $R2_j$ is a threshold value for said second primary signal on a second axis corresponding to a line j of said second set of lines, j=1,m and m≧2;
- $R2_{0i}$ is the origin threshold value for said second primary signal on said second axis corresponding to the line i of said second set of lines;
- $R2_{0j}$ is the origin threshold value for said second primary signal on said second axis corresponding to the line j of said second set of lines;
- $m_1$ is a slope parameter for the line i of said first set of lines, and being a positive value;
- $m_2$ is a slope parameter for the line j of said second set of lines, and being a positive value, and wherein $R1_{0i=1}$ and $R2_{0i=1}$ are respectively equal to $R1_{0j=1}$ and $R2_{0j=1}$;

wherein said third and fourth crossing sets of lines are respectively defined by:

$$R2^*_i = m_3(R1^*_i - R1^*_{0i}) + R2^*_{0i}$$

and $$R2^*_j = -m_4(R1^*_j - R1^*_{0j}) + R2^*_{0j}$$

wherein
- $R1^*_i$ is a threshold value for said first primary signal on said first axis corresponding to a line i of said third set of lines, i=1,n and n≧2;
- $R1^*_j$ is a threshold value for said first primary signal on said first axis corresponding to a line j of said third set of lines, j=1,m and m≧2;
- $R1^*_{0i}$ is the origin threshold value for said primary signal on said first axis corresponding to the line i of said third set of lines;
- $R1^*_{0j}$ is the origin threshold value for said primary signal on said first axis corresponding to the line j of said third set of lines;
- $R2^*_i$ is a threshold value for said second primary signal on said second axis corresponding to a line i of said fourth set of lines, i=1,n and n≧2;
- $R2^*_j$ is a threshold value for said second primary signal on said second axis corresponding to a line j of said fourth set of lines, j=1,m and m≧2;
- $R2^*_{0i}$ is the origin threshold value for said second primary signal on said second axis corresponding to the line i of said fourth set of lines;
- $R2^*_{0j}$ is the origin threshold value for said second primary signal on said second axis corresponding to the line j of said fourth set of lines;
- $m_3$ is a slope parameter for the line i of said third set of lines, and being substantially equal to said slope parameter $m_1$;
- $m_4$ is a slope parameter for the line j of said fourth set of lines, and being substantially equal to said slope parameter $m_2$, and wherein $R^{*1}_{0i=1}$ and $R2^*_{0i=1}$ are respectively equal to $R1^*_{0j=1}$ and $R2^*_{0j=1}$;

wherein $$R1_{0i+1} - R1_{0i} = R1^*_{0i+1} - R1^*_{0i} \text{ for } i=1,n$$

and $$R2_{0j+1} - R2_{0j} = R^*2_{0j+1} - R2^*_{0j} \text{ for } j=1,m;$$

and wherein said specific condition is defined by:

$$\left(\frac{r2 - R2^*_{0i}}{m_3}\right) + R1^*_{0i} \leq r1 < \left(\frac{r2 - R2^*_{0i+1}}{m_3}\right) + R1^*_{0i+1}$$

and $$-m_4(r1 - R1^*_{0j}) + R2^*_{0j} \leq r2 < -m_4(r1 - R1^*_{0j+1}) + R2^*_{0j+1}$$

wherein $C^*_{ij}$ is the class delimited by said line i and a line i+1 of said third set of lines and the line j and a line j+1 of said fourth set of lines, and wherein $i \leq n-1$, $j \leq m-1$;

r1 is said primary signal indicative of the color of said one of said articles;

r2 is said secondary signal further indicative of the color of said one of said articles.

14. A method for classifying articles according to their color as claimed in claim 12, wherein said curves are associated with a plurality of said articles constituting a sample representative of a color range to be sensed, said first pair of wavelengths delimiting a first range of wavelengths corresponding to light reflection values in said curves, said light reflection values in each of said curves being in a substantially linear relationship over said first range of wavelengths.

15. A method for classifying articles according to their color comprising steps of:

selecting a first pair of wavelengths on a plurality of light reflection curves in terms of a reflected light wavelength spectrum;

illuminating with light comprising said first pair of wavelengths an area of one of said articles;

measuring light reflected from said area of one of said articles at said first pair of wavelengths to obtain detected light reflection values corresponding to said first pair of wavelengths;

producing a primary signal representing a resulting difference between said detected light reflection values, said signal being indicative of the color of said one of said articles;

selecting at least one secondary wavelength on said reflected light wavelength spectrum;

illuminating with light comprising said at least one secondary wavelength said area of said one of said articles;

measuring light reflected from said area at said at least one secondary wavelength to produce a secondary signal; said secondary signal being further indicative of the color of said one of said articles;

providing a classification frame comprising a pattern consisting of first and second crossing sets of lines respectively defined by mathematical analysis, said classification frame defining a plurality of color classes;

classifying said one of said articles in a color class of said plurality of color classes defined by said frame, whenever said primary and secondary signals comply with a specific condition; and rejecting said one of said articles whenever said primary and secondary signals do not comply with said specific condition; and wherein said wavelengths of said pair are in a range of about 430 to 520 nm.

16. A method as claimed in claim 15, wherein said wavelengths of said pair are in a range of about 450 to 500 nm.

17. A method for classifying articles according to their color comprising steps of:

selecting a first pair of wavelengths on a plurality of light reflection curves in terms of a reflected light wavelength spectrum;

illuminating with light comprising said first pair of wavelengths an area of one of said articles;

measuring light reflected from said area of one of said articles at said first pair of wavelengths to obtain detected light reflection values corresponding to said first pair of wavelengths;

producing a primary signal representing a resulting difference between said detected light reflection values, said signal being indicative of the color of said one of said articles;

selecting at least one secondary wavelength on said reflected light wavelength spectrum;

illuminating with light comprising said at least one secondary wavelength said area of said one of said articles;

measuring light reflected from said area at said at least one secondary wavelength to produce a secondary signal; said secondary signal being further indicative of the color of said one of said articles;

providing a classification frame comprising a pattern consisting of first and second crossing sets of lines respectively defined by mathematical analysis, said classification frame defining a plurality of color classes;

classifying said one of said articles in a color class of said plurality of color classes defined by said frame, whenever said primary and secondary signals comply with a specific condition; and rejecting said one of said articles whenever said primary and secondary signals do not comply with said specific condition; and wherein one of said at least one secondary wavelength is in a range of about 530 to 650 nm.

18. A method for classifying articles according to their color comprising steps of:

selecting first and second pairs of wavelengths on a plurality of light reflection curves in terms of reflected light wavelength spectrum;

illuminating with light comprising said first and second pairs of wavelengths an area of one of said articles;

measuring light reflected from said area of one of said articles at said first and second pairs of wavelengths to obtain detected light reflection values corresponding to said first and second pairs of wavelengths;

producing respectively first and second primary signals representing a resulting difference between said detected light reflection values, said primary signals being indicative of the color of said one of said articles;

providing a classification frame comprising a pattern consisting of first and second crossing sets of lines respectively defined by mathematical analysis, said classification frame defining a plurality of color classes;

classifying said one of said articles in a color class of said plurality of color classes defined by said frame, whenever said first and second primary signals comply with a specific condition; and rejecting said one of said articles whenever said first primary and second primary signals do not comply with said specific condition; and wherein said wavelengths of said first pair are in a range of about 430 to 520 nm, and said wavelengths of said second pair are in a range of about 530 to 650 nm.

19. A method as claimed in claim 18, wherein said wavelengths of said first pair are in a range of about 450 to 500 nm, and said wavelengths of said second pair are in a range of about 550 to 630 nm.

20. An apparatus for classifying articles according to their color comprising:

means for placing each of said articles at a viewing location in said apparatus;

illumination means providing a light output comprising a pair of wavelengths selected from a plurality of light reflection curves in terms of a reflected light wavelength spectrum, and at least one secondary wavelength selected from said curves, said light output being directed toward said viewing location for illuminating an area of one of said articles passing at said viewing location, means for measuring light reflected from said one of said articles at said pair of wavelengths and at said at least one secondary wavelength to obtain detected light reflection values corresponding respectively to said pair of wavelengths and said at least one secondary wavelength; and computer means for producing a primary signal representing a resulting difference between said detected light reflection values corresponding to said pair of wavelengths, and a secondary signal corresponding to said at least one secondary wavelength, said signals being indicative of the color of said one of said articles;

said computer means defining a classification frame comprising a pattern consisting of first and second crossing sets of lines respectively defined by mathematical analysis, said classification frame defining a plurality of color classes;

said computer means classifying said one of said articles in a color class of said plurality of color classes defined by said frame, whenever said primary signal and said secondary signal comply with a specific condition, said computer rejecting said one of said articles whenever said primary and secondary signals do not comply with said specific condition; and wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for said primary signal on a first axis corresponding to a line i of said first set of lines, $i=1,n$ and $n>2$;

$R1_j$ is a threshold value for said primary signal on a first axis corresponding to a line j of said first set of lines, $j=1,m$ and $m>2$;

$R1_{0i}$ is the origin threshold value for said primary signal On said first axis corresponding to the line i of said first set of lines;

$R1_{0j}$ is the origin threshold value for said primary signal on said first axis corresponding to the line j of said first set of lines;

$R2_i$ is a threshold value for said secondary signal on a second axis corresponding to a line i of said second set of lines, $i=1,n$ and $n>2$;

$R2_j$ is a threshold value for said secondary signal on a second axis corresponding to a line j of said second set of lines, $j=1,m$ and $m>2$;

$R2_{0i}$ is the origin threshold value for said secondary signal on said second axis corresponding to the line i of said second set of lines;

$R2_{0j}$ is the origin threshold value for said secondary signal on said second axis corresponding to the line j of said second set of lines;

$m_1$ is a slope parameter for the line i of said first set of lines, and being a positive value;

$m_2$ is a slope parameter for the line j of said second set of lines, and being a positive value; and wherein $R1_{0i=1}$ and $R2_{0i=1}$ are respectively equal to $R1_{0j=1}$ and $R2_{0j=1}$;

and wherein said specific condition is defined by:

$$\left(\frac{r2 - R2_{0i}}{m_1}\right) + R1_{0i} < r1 < \left(\frac{r2 - R2_{0i+1}}{m_1}\right) + R1_{0i+1}$$

and $$-m_2(r1 - R1_{0j}) + R2_{0j} < R2 < -m_2(r1 - R1_{0j+1}) + R2_{0j+1}$$

wherein $C_{ij}$ is the class delimited by the line i and a line i+1 of said first set of lines and the line j and a line j+1 of said second set of lines, and wherein $i<n-1$, $j<m-1$;

r1 is said primary signal indicative of the color of said one of said articles; and r2 is said secondary signal further indicative of the color of said one of said articles.

21. An apparatus as claimed in claim 20, wherein said illumination means comprises a first light source providing said light output, and at least one other light source providing at least one further light output, two of said light outputs comprising a respective wavelength of said pair of wavelengths, and at least two optical bandpass filters for receiving a respective one of said light outputs, at least two of said at least two optical bandpass filters having a bandwidth being centered to a respective one of wavelengths of said pair of wavelengths; said measuring means comprising at least two photodetectors for receiving a respective reflected light beam corresponding to said at least two of said light outputs and for detecting said light reflection values.

22. An apparatus for classifying articles according to their color comprising:

means for placing each of said articles at a viewing location in said apparatus;

illumination means providing a light output comprising first and second pairs of wavelengths selected from a plurality of light reflection curves in terms of a reflected light wavelength spectrum, said light output being directed toward said viewing location for illuminating an area of one of said articles passing at said viewing location;

means for measuring light reflected from said area of one of said articles at said first and second pairs of wavelengths to obtain detected light reflection values corresponding to said first and second pairs of wavelengths;

computer means for producing respectively first and second primary signals representing a resulting difference between said detected light reflection values, said primary signals being indicative of the color of said one of said articles, said computer means defining a classification frame comprising a pattern consisting of first and second crossing sets of lines respectively defined by mathematical analysis, said classification frame defining a plurality of color classes, said computer means classifying said one of said articles in a color class of said plurality of color classes defined by said frame, whenever said first and second primary signals comply with a specific condition, said computer means rejecting said one of said articles whenever said first and second primary signals do not comply with said specific condition; and wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for said first primary signal on a first axis corresponding to a line i of said first set of lines, i=1, n and n>2;

$R1_j$ is a threshold value for said first primary signal on a first axis corresponding to a line j of said first set of lines, j=1,m and m>2;

$R1_{0i}$ is the origin threshold value for said primary signal on said first axis corresponding to the line i of said first set of lines;

$R1_{0j}$ is the origin threshold value for said primary signal on said first axis corresponding to the line j of said first set of lines;

$R2_i$ is a threshold value for said second primary signal on a second axis corresponding to a line i of said second set of lines, i=1,n and n>2;

$R2_j$ is a threshold value for said second primary signal on a second axis corresponding to a line j of said second set of lines, j=1,m and m>2;

$R2_{0i}$ is the origin threshold value for said second primary signal on said second axis corresponding to the line i of said second set of lines;

$R2_{0j}$ is the origin threshold value for said second primary signal on said second axis corresponding to the line j of said second set of lines;

$m_1$ is a slope parameter for the line i of said first set of lines, and being a positive value;

$m_2$ is a slope parameter for the line j of said second set of lines, and being a positive value, and wherein $R1_{0i=1}$ and are respectively equal to $R1_{0j=1}$ and $R2_{0j=1}$;

and wherein said specific condition is defined by:

$$\left(\frac{r2 - R2_{0i}}{m_1}\right) + R1_{0i} < r1 < \left(\frac{r2 - R2_{0i+1}}{m_1}\right) + R1_{0i+1}$$

and $$-m_2(r1 - R1_{0j}) + R2_{0j} < r2 < -m_2(r1 - R1_{0j+1}) + R2_{0j+1}$$

wherein $C_{ij}$ is the class delimited by the line i and a line i+1 of said first set of lines and the line j and a line j+1 of said second set of lines, and wherein i<n−1, j<m−1;

r1 is said first primary signal indicative of the color of said one of said articles; and r2 is said second primary signal further indicative of the color of said one of said articles.

23. An apparatus for classifying articles according to their color comprising:

means for placing each of said articles at a viewing location in said apparatus;

illumination means providing a light output comprising a pair of wavelengths selected from a plurality of light reflection curves in terms of a reflected light wavelength spectrum, and at least one secondary wavelength selected from said curves said light output being directed toward said viewing location for illuminating an area of one of said articles passing at said viewing location, means for measuring light reflected from said one of said articles at said pair of wavelengths and at said at least one secondary wavelength to obtain detected light reflection values corresponding respectively to said pair of wavelengths and said at least one secondary wavelength;

computer means for producing a primary signal representing a resulting difference between said detected light reflection values corresponding to said pair of wavelengths, and a secondary signal corresponding to said at least one secondary wavelength, said signals being indicative of the color of said one of said articles;

said computer means defining a classification frame comprising a pattern consisting of first and second crossing sets of lines respectively defined by mathematical analysis, said classification frame defining a plurality of color classes;

said computer means classifying said one of said articles in a color class of said plurality of color classes defined by said frame, whenever said primary signal and said secondary signal comply with a specific condition, said computer rejecting said one of said articles whenever said primary and secondary signals do not comply with said specific condition; and means for marking said one of said article according to said color class in which said article has been classified.

24. An apparatus for classifying articles according to their color comprising:

means for placing each of said articles at a viewing location in said apparatus;

illumination means providing a light output comprising a pair of wavelengths selected from a plurality of light reflection curves in terms of reflected a light wavelength spectrum, at least one secondary wavelength and at least one tertiary wavelength selected from said curves, said light output being directed toward said viewing location for illuminating an area of one of said articles passing at said viewing location;

means for measuring light reflected from said one of said articles at said pair of wavelengths, at said at least one secondary wavelength and at said at least one tertiary wavelength to obtain detected light reflection values corresponding respectively to said pair of wavelengths, to said at least one secondary wavelength and to said at least one tertiary wavelength; and computer means for producing a primary signal representing a resulting difference between said detected light reflection values corresponding to said pair of wavelengths, a secondary signal corresponding to said at least one secondary wavelength and a tertiary signal corresponding to said at least one tertiary wavelength, said signals being indicative of the color of said one of said articles, said computer means defining a classification frame comprising:

a first pattern consisting of first and second crossing sets of respective lines i and lines j, i=1,n and n≧2, j=1,m and m≧2, said sets being defined by mathematical analysis, said first pattern laying in a plane intersecting a third axis at a point $R3_0$ which is a first threshold value for said tertiary signal on said third axis;

a second pattern consisting of third and fourth crossing sets of respective lines i and lines j, i=1,n and n≧2, j=1,m and m≧2, said sets being defined by mathematical analysis, said second pattern laying in a plane intersecting said third axis at a point $R3^*_0$ which is a second threshold value for said tertiary signal on said third axis, with $R3^*_0 > R3_0$;

first and second sets of surfaces wherein said first set comprises surfaces respectively intersecting lines i of said first set of lines with corresponding line i of said third set of lines, said second set comprising surfaces respectively intersecting lines j of said second set of lines with corresponding lines j of said fourth set of lines, thereby defining a first stage of (n−1)(m−1) color classification cells delimiting a respective classification space therein, said computer means classifying said one of said articles in a color class $C_{ij}$ associated with a respective one of said cells, whenever said primary signal, said secondary signal and said tertiary signal corresponding to said area of one of said article define a point located inside said one of said classification cells, said computer means classifying said one of said articles in the color class $C_{ij}$ having values of i and j associated with a respective one of adjacent cells, whenever said primary signal, said secondary signal and said tertiary signal corresponding to said area of one of said article define a point located in one or more of said surfaces defining said adjacent cells, and said computer means rejecting said one of said articles whenever said primary signal, said secondary signal and said tertiary signal define a point located outside all of said classification cells, outside all of said surfaces defining said adjacent cells.

25. An apparatus for classifying articles according to their color according to claim 24, wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein
- $R1_i$ is a threshold value for said primary signal on a first axis corresponding to a line i of said first set of lines, i=1,n and n≧2;
- $R1_j$ is a threshold value for said primary signal on a first axis corresponding to a line j of said first set of lines, j=1,m and m≧2;
- $R_{0i}$ is the origin threshold value for said primary signal on said first axis corresponding to the line i of said first set of lines;
- $R1_{0j}$ is the origin threshold value for said primary signal on said first axis corresponding to the line j of said first set of lines;
- $R2_i$ is a threshold value for said secondary signal on a second axis corresponding to a line i of said second set of lines, i=1,n and n≧2;
- $R2_j$ is a threshold value for said secondary signal on a second axis corresponding to a line j of said second set of lines, j=1,m and m≧2,
- $R2_{0i}$ is the origin threshold value for said secondary signal on said second axis corresponding to the line i of said second set of lines;
- $R2_{0j}$ is the origin threshold value for said secondary signal on said second axis corresponding to the line j of said second set of lines;
- $m_1$ is a slope parameter for the line i of said first set of lines, and being a positive value;
- $m_2$ is a slope parameter for the line j of said second set of lines, and being a positive value, and wherein $R1_{0i=1}$ and $R2_{0i=1}$ are respectively equal to $R1_{01=1}$ and $R2_{0j=1}$;

wherein said third and fourth crossing sets of lines are respectively defined by:

$$R2^*_i = m_3(R1^*_i - R1^*_{0i}) + R2^*_{0i}$$

and $$R2^*_j = -m_4(R1^*_j - R1^*_{0j}) + R2^*_{0j}$$

wherein
- $R1^*_i$ is a threshold value for said primary signal on said first axis corresponding to a line i of said third set of lines, i=1,n and n≧2;
- $R1^*_j$ is a threshold value for said primary signal on said first axis corresponding to a line j of said third set of lines, j=1,m and m≧2;
- $R1^*_{0i}$ is the origin threshold value for said primary signal on said first axis corresponding to the line i of said third set of lines;
- $R1^*_{0j}$ is the origin threshold value for said primary signal on said first axis corresponding to the line j of said third set of lines;
- $R2^*_i$ is a threshold value for said secondary signal on said second axis corresponding to a line i of said fourth set of lines, i=1,n and n≧2;
- $R2^*_j$ is a threshold value for said secondary signal on said second axis corresponding to a line j of said fourth set of lines, j=1,m and m≧2,
- $R2^*_{0i}$ is the origin threshold value for said secondary signal on said second axis corresponding to the line i of said fourth set of lines;
- $R2^*_{0j}$ is the origin threshold value for said secondary signal on said second axis corresponding to the line j of said fourth set of lines;

$m_3$ is a slope parameter for the line i of said third set of lines, and being substantially equal to said slope parameter $m_1$;

$m_4$ is a slope parameter for the line j of said fourth set of lines, and being substantially equal to said slope parameter $m_2$, and wherein $R1^*_{0i=1}$ and $R2^*_{0i=1}$ are respectively equal to $R1^*_{0j=1}$ and $R2^*_{0j=1}$;

and wherein $$R1_{0i+1} - R1_{0i} = R1^*_{0i=1} - R1^*_{0i} \text{ for } i=1,n$$

and $$R2_{0j+1} - R2_{0j} = R2^*_{0j+1} - R2^*_{0j} \text{ for } j=1,m.$$

26. An apparatus as claimed in claim 24 further comprising means for marking said one of said article according to said color class in which said article has been classified.

27. An apparatus for classifying articles according to their color comprising:

means for placing each of said articles at a viewing location in said apparatus;

illumination means providing a light output comprising first and second pairs of wavelengths and at least one tertiary wavelength selected from a plurality of light reflection curves in terms of reflected light wavelength spectrum, said light output being directed toward said viewing location for illuminating an area of one of said articles passing at said viewing location;

means for measuring light reflected from said area of one of said articles at said first and second pairs of wavelengths and at said at least one tertiary wavelength to obtain detected light reflection values corresponding to said first and second pairs of wavelengths and to said at least one tertiary wavelength;

computer means for producing respectively first and second primary signals corresponding respectively to said first and second pairs of wavelengths, said primary signals being representative of a resulting difference between said detected light reflection values, and a tertiary signal corresponding to said at least one tertiary wavelength, said signals being indicative of the color of said one of said articles, said computer means defining a classification frame comprising:

a first pattern consisting of first and second crossing sets of respective lines i and lines j, i=1,n and n≥2, j=1,m and m≥2, said sets being defined by mathematical analysis, said first pattern laying in a plane intersecting a third axis at a point $R3_0$ which is a first threshold value for said tertiary signal on said third axis;

a second pattern consisting of third and fourth crossing sets of respective lines i and lines j, i=1,n and n≥2, j=1,m and m≥2, said sets being defined by mathematical analysis, said second pattern laying in a plane intersecting said third axis at a point $R3^*_0$ which is a second threshold value for said tertiary signal on said third axis with $R3^*_0 > R3_0$;

first and second sets of surfaces wherein said first set comprises surfaces respectively intersecting lines i of said first set of lines with corresponding lines i of said third set of lines, said second set comprising surfaces respectively intersecting lines j of said second set of lines with corresponding lines j of said fourth set of lines, thereby defining a first stage of (n−1)(m−1) color classification cells delimiting a respective classification space therein, said computer means classifying said one of said articles in a color class $C_{ij}$ associated with a respective one of said cells, whenever said first and second primary signals and said tertiary signal corresponding to said area of one of said article define a point located inside said one of said classification cells, said computer means classifying said one of said articles in the color class $C_{ij}$ having values of i and j associated with a respective one of adjacent cells, whenever said first and second primary signals and said secondary signal corresponding to said area of one of said article define a point located in one or more of said surfaces defining said adjacent cells, said computer rejecting said one of said articles whenever said first and second primary signals and said tertiary signal define a point located outside all of said classification cells and outside all of said surfaces defining said adjacent cells.

28. An apparatus for classifying articles according to their color according to claim 27, wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for said first primary signal on a first axis corresponding to a line i of said first set of lines, i=1,n and n≥2;

$R1_j$ is a threshold value for said first primary signal on a first axis corresponding to a line j of said first set of lines, j=1,m and m≥2;

$R1_{0i}$ is the origin threshold value for said first primary signal on said first axis corresponding to the line i of said first set of lines;

$R1_{0j}$ is the origin threshold value for said primary signal on said first axis corresponding to the line j of said first set of lines;

$R2_i$ is a threshold value for said second primary signal on a second axis corresponding to a line i of said second set of lines, i=1,n and n≥2;

$R2_j$ is a threshold value for said second primary signal on a second axis corresponding to a line j of said second set of lines, j=1,m and m≥2;

$R2_{0i}$ is the origin threshold value for said second primary signal on said second axis corresponding to the line i of said second set of lines (54);

$R2_{0j}$ is the origin threshold value for said second primary signal on said second axis corresponding to the line j of said second set of lines;

$m_1$ is a slope parameter for the line i of said first set of lines, and being a positive value;

$m_2$ is a slope parameter for the line j of said second set of lines, and being a positive value, and wherein $R1_{0i=1}$ and $R2_{0i=1}$ are respectively equal to $R1_{0j=1}$ and $R2_{0j=1}$;

wherein said third and fourth crossing sets of lines are respectively defined by:

$$R2^*_i = m_3(R1^*_i - R1^*_{0i}) + R2^*_{0i}$$

and $$R2^*_j = -m_4(R1^*_j - R1^*_{0j}) + R2^*_{0j}$$

wherein $R1^*_i$ is a threshold value for said first primary signal on said first axis corresponding to a line i of said third set of lines, i=1,n and n≧2;

$R1^*_j$ is a threshold value for said first primary signal on said first axis corresponding to a line j of said third set of lines, j=1,m and m≧2;

$R1^*_{0i}$ is the origin threshold value for said primary signal on said first axis corresponding to the line i of said third set of lines;

$R1^*_{0j}$ is the origin threshold value for said primary signal on said first axis corresponding to the line j of said third set of lines;

$R2^*_i$ is a threshold value for said second primary signal on said second axis corresponding to a line i of said fourth set of lines, i=1,n and n≧2;

$R2^*_j$ is a threshold value for said second primary signal on said second axis corresponding to a line j of said fourth set of lines, j=1,m and m≧2;

$R2^*_{0i}$ is the origin threshold value for said second primary signal on said second axis corresponding to the line i of said fourth set of lines+;

$R2^*_{0j}$ is the origin threshold value for said second primary signal on said second axis corresponding to the line j of said fourth set of lines;

$m_3$ is a slope parameter for said line i of said third set of lines, and being substantially equal to said slope parameter $m_1$;

$m_4$ is a slope parameter for the line j of said fourth set of lines, and being substantially equal to said slope parameter $m_2$ and wherein $R1^*_{0i=1}$ and $R2^*_{0i=1}$ are respectively equal to $R1^*_{0j=1}$ and $R2^*_{0j=1}$;

and wherein $$R1_{0i+1} - R1_{0i} = R1^*_{0i+1} - R1^*_{0i} \text{ for } i=1,n$$

and $$R2_{0j+1} - R2_{0j} = R2^*_{0j+1} - R2^*_{0j} \text{ for } j=1,m.$$

29. An apparatus as claimed in claim 27, further comprising means for marking said one of said article according to said color class in which said article has been classified.

30. An apparatus for classifying articles according to their color comprising:

means for placing each of said articles at a viewing location in said apparatus;

illumination means providing a light output comprising a pair of wavelengths selected from a plurality of light reflection curves in terms of a reflected light wavelength spectrum, at least one secondary wavelength and at least one tertiary wavelength selected from said curves, said light output being directed toward said viewing location for illuminating an area of one of said articles passing at said viewing location;

means for measuring light reflected from said area of one of said articles at said pair of wavelengths, at said at least one secondary wavelength and at said at least one tertiary wavelength to obtain detected light reflection values corresponding respectively to said pair of wavelengths, to said at least one secondary wavelength and to said at least one tertiary wavelength; and computer means for producing a primary signal representing a resulting difference between said detected light reflection values corresponding to said pair of wavelengths, a secondary signal corresponding to said at least one secondary wavelength and a tertiary signal corresponding to said at least one tertiary wavelength, said signals being indicative of the color of said one of said articles, said computer means defining a classification frame comprising:

a first pattern consisting of first and second crossing sets of respective lines i and lines j, i=1,n and n≧2, j=1,m and m≧2, said sets being defined by mathematical analysis, said first pattern laying in a plane intersecting a third axis at a point $R3_0$ which is a first threshold value for said tertiary signal on said third axis;

a second pattern consisting of third and fourth crossing sets of respective lines i and lines j, i=1,n and n≧2, j=1,m and m≧2, said sets being defined by mathematical analysis, said second pattern laying in a plane intersecting said third axis at a point $R3^*_0$ which is a second threshold value for said tertiary signal on said third axis, with $R3^*_0 > R3_0$;

first and second sets of surfaces wherein said first set comprises surfaces respectively intersecting lines i of said first set of lines with corresponding line i of said third set of lines, said second set comprising surfaces respectively intersecting lines j of said second set of lines with corresponding lines j of said fourth set of lines, thereby defining a first stage of (n−1)(m−1) color classification cells delimiting a respective classification space therein, said computer means classifying said one of said articles in a color class $C_{ij}$ associated with a respective one of said cells, whenever said primary signal, said secondary signal and said tertiary signal corresponding to said area of one of said article define a point located inside said one of said classification cells, said computer means classifying said one of said articles in the color class $C_{ij}$ having values of i and j associated with a respective one of adjacent cells, whenever said primary signal, said secondary signal and said tertiary signal corresponding to said area of one of said article define a point located in one or more of said surfaces defining said adjacent cells, said computer means classifying said one of said articles in a color class $C^*_{ij}$ of a plurality of complementary color classes defined by said second pattern, whenever said tertiary signal equal or greater than $R3^*_0$ and said primary and secondary signals comply with a specific condition, said computer means rejecting said one of said articles whenever said primary signal, said secondary signal and said tertiary signal do not comply with said specific condition and define a point located outside all of said classification cells, and outside all of said surfaces defining said adjacent cells.

31. An apparatus for classifying articles according to their color according to claim 30, wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for said primary signal on a first axis corresponding to a line i of said first set of lines, i=1,n and n≥2;

$R1_j$ is a threshold value for said primary signal on a first axis corresponding to a line j of said first set of lines, j=1,m and m≥2;

$R1_{0i}$ is the origin threshold value for said primary signal on said first axis corresponding to the line i of said first set of lines;

$R1_{0j}$ is the origin threshold value for said primary signal on said first axis corresponding to the line j of said first set of lines;

$R2_i$ is a threshold value for said secondary signal on a second axis corresponding to a line i of said second set of lines, i=1,n and n≥2;

$R2_j$ is a threshold value for said secondary signal on a second axis corresponding to a line j of said second set of lines, j=1,m and m≥2, $R2_{0i}$ is the origin threshold value for said secondary signal on said second axis corresponding to the line i of said second set of lines;

$R2_{0j}$ is the origin threshold value for said secondary signal on said second axis corresponding to the line j of said second set of lines;

$m_1$ is a slope parameter for the line i of said first set of lines, and being a positive value;

$m_2$ is a slope parameter for the line j of said second set of lines, and being a positive value, and wherein $R1_{0i=1}$ and $R2_{0i=i}$ are respectively equal to $R1_{0j=1}$ and $R2_{0j=1}$;

wherein said third and fourth crossing sets of lines are respectively defined by:

$$R2^*_i = m_3(R1^*_i - R1^*_{0i}) + R2^*_{0i}$$

and $$R2^*_j = -m_4(R1^*_j - R1^*_{0j}) + R2^*_{0j}$$

wherein $R1^*_i$ is a threshold value for said primary signal on said first axis corresponding to a line i of said third set of lines, i=1,n and n≥2;

$R1^*_j$ is a threshold value for said primary signal on said first axis corresponding to a line j of said third set of lines, j=1,m and m≥2;

$R1_{0i}$ is the origin threshold value for said primary signal on said first axis corresponding to the line i of said third set of lines;

$R1_{0j}$ is the origin threshold value for said primary signal on said first axis corresponding to the line j of said third set of lines;

$R2^*_i$ is a threshold value for said secondary signal on said second axis corresponding to a line i of said fourth set of lines, i=1,n and n≥2;

$R2^*_j$ is a threshold value for said secondary signal on said second axis corresponding to a line j of said fourth set of lines, j=1,m and m≥2;

$R2^*_{0i}$ is the origin threshold value for said secondary signal on said second axis corresponding to the line i of said fourth set of lines;

$R2^*_{0j}$ is the origin threshold value for said secondary signal on said second axis corresponding to the line j of said fourth set of lines;

$m_3$ is a slope parameter for the line i of said third set of lines, and being substantially equal to said slope parameter $m_1$;

$m_4$ is a slope parameter for the line j of said fourth set of lines, and being substantially equal to said slope parameter $m_2$, and wherein $R1^*_{0i=1}$ and $R2^*_{0i=1}$ are respectively equal to $R1^*_{0j=1}$ and $R2^*_{0j=1}$;

wherein $$R1_{0i+1} - R1_{0i} = R1^*_{0i+1} - R1^*_{0i} \text{ for } i=1,n$$

and $$R2_{0i+1} - R2_{0j} = R2^*_{0j+1} - R2^*_{0j} \text{ for } j=1,m$$

and wherein said specific condition is defined by:

$$\left( \frac{r2 - R2^*_{0i}}{m_3} \right) + R1^*_{0i} \geq r1 \geq \left( \frac{r2 - R2^*_{0i+1}}{m_3} \right) + R1^*_{0i+1}$$

and $$-m_4(r1 - R1^*_{0j}) + R2^*_{0j} \geq r2 \geq -m_4(r1 - R1^*_{0j+1}) + R2^*_{0j+1}$$

wherein $C^*_{ij}$ the class delimited by the line i and a line i+1 of said third set of lines and the line j and a line j+1 of said fourth set of lines, and wherein i≤n−1, j≤m−1;

r1 is said primary signal indicative of the color of said one of said articles;

r2 is said secondary signal further indicative of the color of said one of said articles.

32. An apparatus as claimed in claim 30, further comprising means for marking said one of said article according to said color class in which said article has been classified.

33. An apparatus for classifying articles according to their color comprising:

means for placing each of said articles at a viewing location in said apparatus;

illumination means providing a light output comprising a first and a second pair of wavelengths and at least one tertiary wavelength selected from a plurality of light reflection curves in terms of reflected light wavelength spectrum, said light output being directed toward said viewing location for illuminationg an area of one of said articles passing at said viewing location;

means for measuring light reflected from said area of one of said articles at said first and second pairs of wavelengths and at said at least one tertiary wavelength to obtain reflected light reflection values corresponding to said first and second pairs of wavelengths and to said at least one tertiary wavelength;

computer means for producing respectively first and second primary signals corresponding respectively to said first and second pairs of wavelengths, said primary signals being representative of a resluting difference between said detected light reflection values, and a tertiary signal corresponding to said at least one tertiary wavelength, said signals being indicative of the color of said one of said articles, said computer means defining a classification frame comprising:

a first pattern consisting of first and second crossing sets of respective lines i and lines j, i=1,n and n≧2, j=1,m and m≧2, said sets being defined by mathematical analysis, said first pattern laying in a plane intersecting a third axis at a point $R3_0$ which is a first threshold value for said tertiary signal on said third axis;

a second pattern consisting of third and fourth crossing sets of respective lines i and lines j, i=1,n and n≧2, j=1,m and m≧2, said sets being defined by mathematical analysis, said second pattern laying in a plane intersecting third axis at a point $R3^*_0$ which is a second threshold value for said tertiary signal on said third axis, with $R3^*_0 > R3_0$;

first and second sets of surfaces wherein said first set comprises surfaces respectively intersecting lines i of said first set of lines with corresponding lines i of said third set of lines, said second set comprising surfaces respectively intersecting lines j of said second set of lines with corresponding lines j of said fourth set of lines, thereby defining a first stage of (n−1)(m−1) color classification cells delimiting a respective classification space therein, said computer means classifying said one of said articles in a color class $C_{ij}$ associated with a respective one of said cells, whenever said first and second primary signals and said tertiary signal corresponding to said area of one of said article define a point located inside said one of said classification cells, said computer means classifying said one of said articles in the color class $C_{ij}$ having either of i and j associated with a respective one of adjacent cells, whenever said first and second primary signals and said tertiary signal corresponding to said area of one of said article define a point located in one or more of said surfaces defining said adjacent cells, said computer means classifying said one of said articles in a color class $C^*_{ij}$ of a plurality of complementary color classes defined by said second pattern, whenever said tertiary signal is equal to or greater than $R3^*_0$ and said first and second primary signals comply with a specific condition, said computer means rejecting said one of said articles whenever said first and second primary signals and said tertiary signal do not comply with said specific condition and define a point located outside all of said classification cells and outside all of said surfaces defining said adjacent cells.

34. An apparatus for classifying articles according to their color according to claim 38, wherein said first and second crossing sets of lines are respectively defined by:

$$R2_i = m_1(R1_i - R1_{0i}) + R2_{0i}$$

and $$R2_j = -m_2(R1_j - R1_{0j}) + R2_{0j}$$

wherein $R1_i$ is a threshold value for said first primary signal on a first axis corresponding to a line i of said first set of lines, i=1,n and n≧2;

$R1_j$ is a threshold value for said first primary signal on a first axis corresponding to a line j of said first set of lines, j=1,m and m≧2;

$R1_{0i}$ is the origin threshold value for said first primary signal on said first axis corresponding to the line i of said first set of lines;

$R1_{0j}$ is the origin threshold value for said primary signal on said first axis corresponding to the line j of said first set of lines;

$R2_i$ is a threshold value for said second primary signal on a second axis corresponding to a line i of said second set of lines, i=1,n and n≧2;

$R2_j$ is a threshold value for said second primary signal on a second axis corresponding to a line j of said second set of lines, j=1,m and m≧2;

$R2_{0i}$ is the origin threshold value for said second primary signal on said second axis corresponding to the line i of said second set of lines;

$R2_{0j}$ is the origin threshold value for said second primary signal on said second axis corresponding to the line j of said second set of lines;

$m_1$ is a slope parameter for said line i of said first set of lines, and being a positive value;

$m_2$ is a slope parameter for the line j of said second set of lines, and being a positive value, and wherein $R1_{0i=1}$ and $R2_{0i=1}$ are respectively equal to $R1_{0j=1}$ and $R2_{0j=1}$;

wherein said third and fourth crossing sets of lines are respectively defined by:

$$R2^*_i = m_3(R1^*_i - R1^*_{0i}) + R2^*_{0i}$$

and $$R2^*_j = -m_4(R1^*_j - R1^*_{0j}) + R2^*_{0j}$$

wherein $R1^*_i$ is a threshold value for said first primary signal on said first axis corresponding to a line i of said third set of lines, i=1,n and n≧2;

$R1^*_j$ is a threshold value for said first primary signal on said first axis corresponding to a line j of said third set of lines, j=1,m and m≧2;

$R1^*_{0i}$ is the origin threshold value for said primary signal on said first axis corresponding to the line i of said third set of lines;

$R1^*_{0j}$ is the origin threshold value for said primary signal on said first axis corresponding to the line j of said third set of lines;

$R2^*_i$ is a threshold value for said second primary signal on said second axis corresponding to a line i of said fourth set of lines, i=1,n and m≧2;

$R2^*_j$ is a threshold value for said second primary signal on said second axis corresponding to a line j of said fourth set of lines, j=1,m and m≧2;

$R2^*_{0i}$ is the origin threshold value for said second primary signal on said second axis corresponding to the line i of said fourth set of lines;

$R2^*_{0j}$ is the origin threshold value for said second primary signal on said second axis corresponding to the line j of said fourth set of lines;

$m_3$ is a slope parameter for the line i of said third set of lines, and being substantially equal to said slope parameter $m_1$;

$m_4$ is a slope parameter for the line j of said fourth set of lines, and being substantially equal to said slope parameter $m_2$, and wherein $R1^*_{0i=1}$ and $R2^*_{0i=1}$ are respectively equal to $R1^*_{0j=1}$ and $R2^*_{0j=1}$;

and wherein $$R1_{0i+1} - R1_{0i} = R1^*_{0i+1} - R1^*_{0i} \text{ for } i=1,n$$

and $$R2_{0j+1} - R2_{0j} = R2^*_{0j+1} - R2^*_{0j} \text{ for } j=1,m;$$

and wherein said specific condition is defined by:

$$\left( \frac{r2 - R2^*_{0i}}{m_3} \right) + R1^*_{0i} \leq r1 < \left( \frac{r2 - R2^*_{0i+1}}{m_3} \right) + R1^*_{0i+1}$$

and $$-m_4(r1 - R1^*_{0j}) + R2^*_{0j} \leq r2 < -m_4(r1 - R1^*_{0j+1}) + R2^*_{0j+1}$$

wherein $C^*_{ij}$ is the class delimited by the line i and a line i+1 of said third set of lines and the line j and a line j+1 of said fourth set of lines, and wherein $i \leq n-1$, $j \leq m-1$;

r1 is said first primary signal indicative of the color of said one of said articles; and r2 is said second primary signal further indicative of the color of said one of said articles.

35. An apparatus as claimed in claim 33, further comprising means for marking said one of said article according to said color class in which said article has been classified.

36. An apparatus for classifying articles according to their color comprising:

means for placing each of said articles at a viewing location in said apparatus;

illumination means providing a light output comprising a pair of wavelengths selected from a plurality of light reflection curves in terms of a reflected light wavelength spectrum, and at least one secondary wavelength selected from said curves, said light output being directed toward said viewing location for illuminating an area of one of said articles passing at said viewing location, a spectrophotometer for measuring light reflected from said one of said articles at said pair of wavelengths and at said at least one secondary wavelength to light reflection values corresponding respectively to said pair of wavelengths and said at least one secondary wavelength; and computer means for producing a primary signal representing a resulting difference between said detected light reflection values corresponding to said pair of wavelengths, and a secondary signal corresponding to said at least one secondary wavelength, said signals being indicative of the color of said one of said articles;

said computer means defining a classification frame comprising a pattern consisting of first and second crossing sets of lines respectively defined by mathematical analysis, said classification frame defining a plurality of color classes;

said computer means classifying said one of said articles in a color class of said plurality of color classes defined by said frame, whenever said primary signal and said secondary signal comply with a specific condition, said computer rejecting said one of said articles whenever said primary and secondary signals do not comply with said specific condition.

37. An apparatus for classifying articles according to their color comprising:

means for placing each of said articles at a viewing location in said apparatus;

illumination means providing a light output comprising a pair of wavelengths selected from a plurality of light reflection curves in terms of a reflected light wavelength spectrum, and at least one secondary wavelength selected from said curves, said light output being directed toward said viewing location for illuminating an area of one of said articles passing at said viewing location, means for measuring light reflected from said one of said articles at said pair of wavelengths and at said at least one secondary wavelength to obtain detected light reflection values corresponding respectively to said pair of wavelengths and said at least one secondary wavelength; and computer means for producing a primary signal representing a resulting difference between said detected light reflection values corresponding to said pair of wavelengths, and a secondary signal corresponding to said at least one secondary wavelength, said signals being indicative of the color of said one of said articles;

said computer means defining a classification frame comprising a pattern consisting of first and second crossing sets of lines respectively defined by mathematical analysis, said classification frame defining a plurality of color classes;

said computer means classifying said one of said articles in a color class of said plurality of color classes defined by said frame, whenever said primary signal and said secondary signal comply with a specific condition, said computer rejecting said one of said articles whenever said primary and secondary signals do not comply with said specific condition;

wherein said means for measuring light reflected from said area of one of said articles comprises:

a beam splitter for splitting said reflected light into at least two substantially identical light beams;

at least two optical bandpass filters for receiving a respective one of said light beams, at least two of said optical bandpass filters having a bandwidth being centered to a respective one of wavelengths of said pair of wavelengths;

at least two photodetectors being optically connected to a respective one of said optical filters for receiving corresponding light beam traversing through said at least two bandpass filters and for detecting said light reflection values.

38. An apparatus for classifying articles according to their color comprising:

means for placing each of said articles at a viewing location in said apparatus;

illumination means providing a light output comprising first and second pairs of wavelengths selected from a plurality of light reflection curves in terms of a reflected light wavelength spectrum, said light output being directed toward said viewing location for illuminating an area of one of said articles passing at said viewing location;

means for measuring light reflected from said area of one of said articles at said first and second pairs of wavelengths to obtain detected light reflection values corresponding to said first and second pairs of wavelengths;

computer means for producing respectively first and second primary signals representing a resulting difference between said detected light reflection values, said primary signals being indicative of the color of said one of said articles, said computer means defining a classification frame comprising a pattern consisting of first and second crossing sets of lines respectively defined by mathematical analysis, said classification frame defining a plurality of color classes, said computer means classifying said one of said articles in a color class of said plurality of color classes defined by said frame, whenever said first and second primary signals comply with a specific condition, said computer means rejecting said one of said articles whenever said first and second primary signals do not comply with said specific condition; and means for marking said one of said article according to said color class in which said article has been classified.

* * * * *